(12) United States Patent
Maeng

(10) Patent No.: US 11,889,948 B2
(45) Date of Patent: Feb. 6, 2024

(54) ARTIFICIAL INTELLIGENCE COOKING DEVICE

(71) Applicant: LG ELECTRONICS INC., Seoul (KR)

(72) Inventor: Jichan Maeng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 674 days.

(21) Appl. No.: 16/858,221

(22) Filed: Apr. 24, 2020

(65) Prior Publication Data

US 2021/0209465 A1 Jul. 8, 2021

(30) Foreign Application Priority Data

Jan. 6, 2020 (KR) .......................... 10-2020-0001604

(51) Int. Cl.
| | | |
|---|---|---|
| *G06N 3/08* | (2023.01) | |
| *A47J 27/00* | (2006.01) | |
| *G06K 9/62* | (2022.01) | |
| *A47J 36/32* | (2006.01) | |
| *A47J 27/62* | (2006.01) | |
| *A47J 27/56* | (2006.01) | |
| *G06F 18/214* | (2023.01) | |
| *G06F 3/0482* | (2013.01) | |

(52) U.S. Cl.
CPC .......... *A47J 36/321* (2018.08); *A47J 27/002* (2013.01); *A47J 27/004* (2013.01); *A47J 27/56* (2013.01); *A47J 27/62* (2013.01); *G06F 18/2155* (2023.01); *G06N 3/08* (2013.01); *G06F 3/0482* (2013.01)

(58) Field of Classification Search
CPC ............................... A47J 36/321; A47J 27/004
See application file for complete search history.

(56) References Cited

U.S. PATENT DOCUMENTS

| | | | |
|---|---|---|---|
| 9,675,199 B2* | 6/2017 | Buendia Garcia | F23N 5/242 |
| 2009/0173731 A1* | 7/2009 | Nagamitsu | H05B 6/062 |
| | | | 219/622 |
| 2009/0258331 A1* | 10/2009 | Do | G09B 21/003 |
| | | | 434/127 |
| 2020/0000276 A1* | 1/2020 | Kemker | G06F 16/252 |
| 2020/0363778 A1* | 11/2020 | Mahapatra | H05B 6/6464 |
| 2022/0167788 A1* | 6/2022 | Oh | A47J 27/0802 |

* cited by examiner

*Primary Examiner* — Elizabeth Insler
(74) *Attorney, Agent, or Firm* — Birch, Stewart, Kolasch & Birch, LLP

(57) ABSTRACT

An artificial intelligence cooking device can include an output interface; a heater configured to heat ingredients contained in a cooking vessel; a sensor comprising at least one of a weight sensor configured to detect a weight of the cooking vessel containing the ingredients or a vibration sensor configured to detect a vibration signal of the ingredients contained in the cooking vessel; and a processor configured to obtain cooking information including at least one of cooking behavior information or state information about the ingredients by using data obtained by the sensor; and output a guide based on the cooking information through the output interface.

17 Claims, 20 Drawing Sheets

FIG. 10
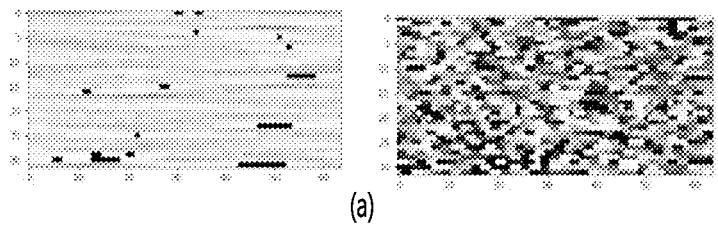
(a)
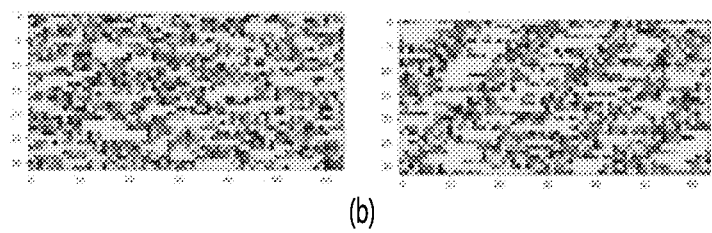
(b)
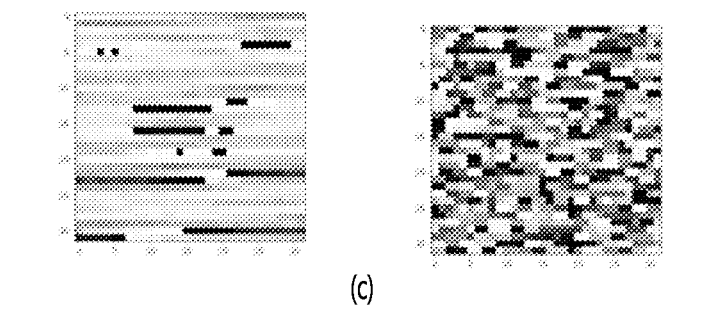
(c)
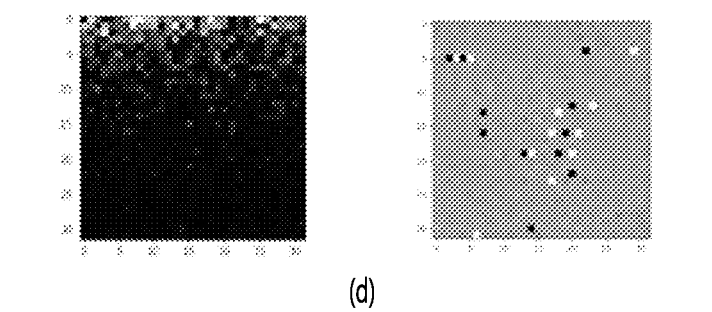
(d)
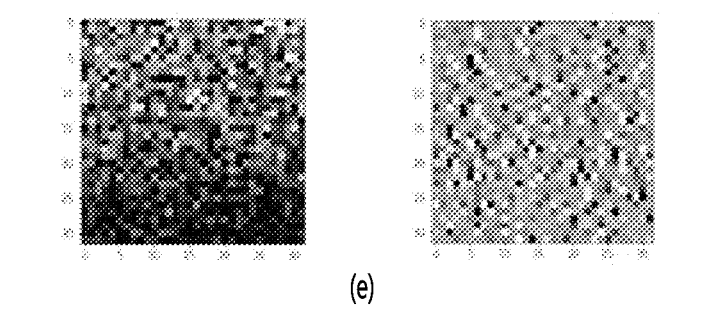
(e)

FIG. 11
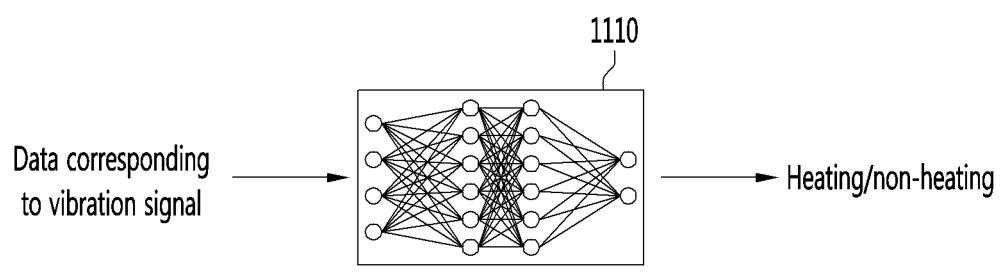
(a)
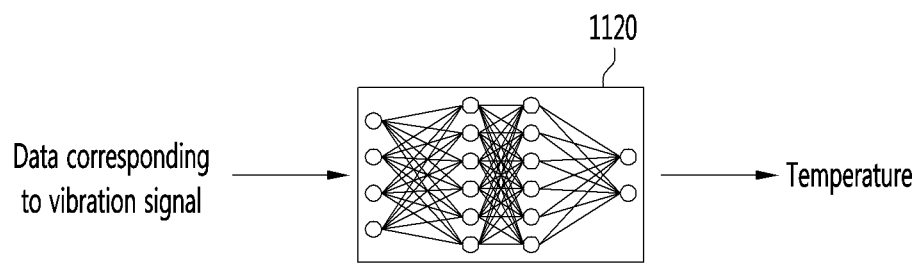
(b)

FIG. 17
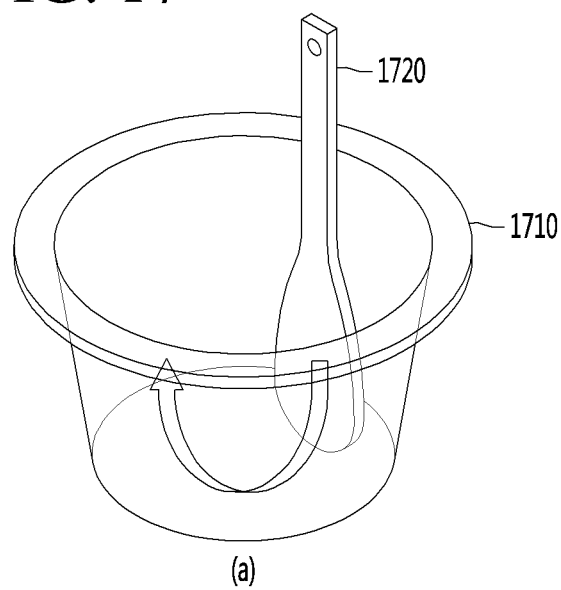
(a)
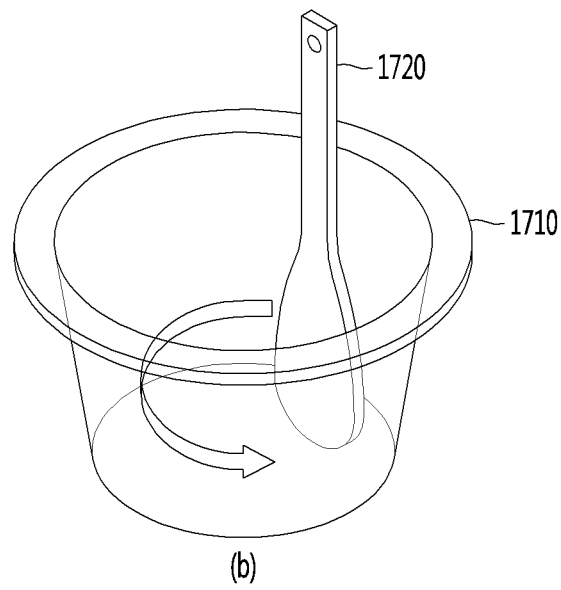
(b)

FIG. 18
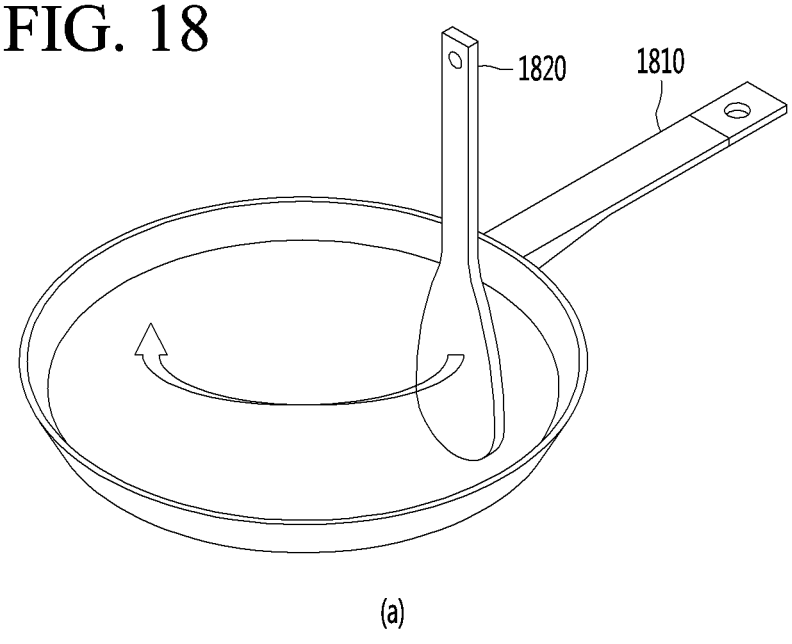
(a)
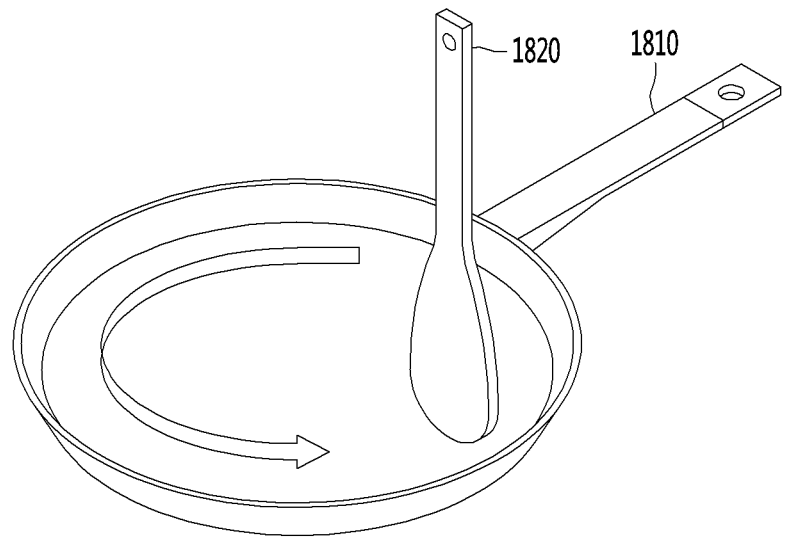
(a)

[Red wine sauce]

1. Add red wine and garlic and heat for 5 minutes at medium intensity

2. Add butter and heat for 15 minutes at low intensity while stirring (a)

(b)

ARTIFICIAL INTELLIGENCE COOKING DEVICE

CROSS-REFERENCE TO RELATED APPLICATIONS

This application claims priority to Korean Patent Application No. 10-2020-0001604 filed in the Republic of Korea on Jan. 6, 2020, the entire contents of which are hereby incorporated by reference in its entirety.

BACKGROUND

The present disclosure relates to an artificial intelligence cooking device capable of serving as a cooking assistant by outputting a guide necessary for a user based on at least one of a cooking behavior of a user or a state of ingredients.

Artificial intelligence, which means that computers can imitate a human intelligence, is a field of computer engineering and information technology that studies a method for allowing the computers to think, learn, self-develop, and the like that can be performed by the human intelligence. Further, the artificial intelligence does not exist by itself, but is directly or indirectly related to other fields of computer science. Particularly in the modern age, attempts to introduce artificial intelligence elements in various fields of information technology and to utilize the artificial intelligence elements in solving problems in the field are being actively carried out.

In an example, a technology that uses the artificial intelligence to recognize and learn an ambient situation, provides information desired by a user in a desired form, or performs an operation or a function desired by the user is being actively researched. Further, an electronic device providing such various operations and functions may be referred to as an artificial intelligence device.

Meanwhile, during cooking, the user has a lot of elements to care about. Examples include fire control, heat start/end, heat time settings, and state notification, according to situations.

Therefore, when there is a cooking assistant, the cooking assistant can be a great help for a user's cooking. As one example, a cooking assistant appears with a chef in a cooking program.

SUMMARY

The present disclosure has been made in an effort to solve the above-described problems, and an object of the present disclosure is to provide an artificial intelligence cooking device capable of serving as a cooking assistant by outputting a guide necessary for a user based on at least one of a cooking behavior of a user or a state of ingredients.

According to an embodiment, an artificial intelligence cooking device includes an output interface, a heater configured to heat ingredients contained in a cooking vessel, a sensor including at least one of a weight sensor configured to detect a weight of the cooking vessel containing the ingredients or a vibration sensor configured to detect a vibration signal of the ingredients contained in the cooking vessel, and a processor configured to: obtain cooking information including at least one of cooking behavior information or state information about the ingredients by using the data obtained by the sensor; and output a guide based on the cooking information through the output interface.

The details of one or more embodiments are set forth in the accompanying drawings and the description below.

Other features will be apparent from the description and drawings, and from the claims.

BRIEF DESCRIPTION OF THE DRAWINGS

FIG. 10, including parts (a)-(e), illustrates 2D images of vibration signals when ingredients are boiling and of vibration signals when the ingredients are not boiling according to an embodiment of the present disclosure.

FIG. 11, including parts (a) and (b), illustrates diagrams for describing a method for generating an artificial intelligence model according to an embodiment of the present disclosure.

FIGS. 17 to 19 are diagrams for describing a variety of cooking behavior information that an artificial intelligence model has to infer.

DETAILED DESCRIPTION OF THE EMBODIMENTS

Figure 1:
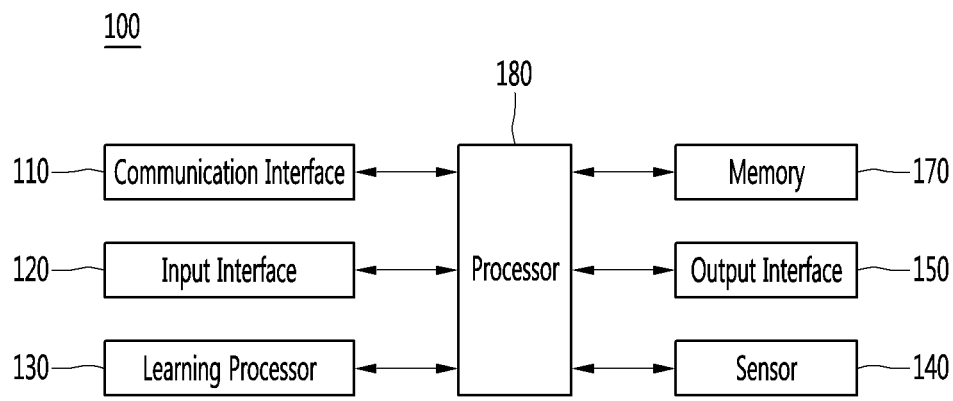
FIG. 1 illustrates an AI device 100 according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "interface" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components. In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network. Machine learning may be classified into supervised learning, unsupervised learning, and reinforcement learning according to a learning method.

The supervised learning refers to a method of learning an artificial neural network when a label for learning data is given, and the label may mean the correct answer (or result value) that the artificial neural network infers when the learning data is input to the artificial neural network. The unsupervised learning refers to a method of learning an artificial neural network when a label for learning data is not given. The reinforcement learning refers to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot refers to a machine that automatically processes or operates a given task by its own ability. In particular, a robot having a function of recognizing an environment and performing a self-determination operation may be referred to as an intelligent robot. Robots may be classified into industrial robots, medical robots, home robots, military robots, and the like according to the use purpose or field.

The robot includes a driver that includes an actuator or a motor and may perform various physical operations such as moving a robot joint. In addition, a movable robot may include a wheel, a brake, a propeller, and the like in a driver, and may travel on the ground through the driver or fly in the air.

<Self-Driving>

Self-driving refers to a technique of driving for oneself, and a self-driving vehicle refers to a vehicle that travels without an operation of a user or with a minimum operation of a user. For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like. At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together.

However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure. The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensor 140, an output interface 150, a memory 170, and a processor 180. The communication interface 110 can transmit and receive data to and from external devices such as other AI devices 100a to 100e and the AI server 200 by using wire/wireless communication technology. For example, the communication interface 110 can transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), BLUETOOTH™, RFID (Radio Frequency Identification), Infrared Data Association (IrDA), ZIGBEE, NFC (Near Field Communication), and the like.

The input interface 120 can obtain various kinds of data. Further, the input interface 120 may include a camera for inputting a video signal, a microphone for receiving an audio signal, and a user input interface for receiving information from a user. The camera or the microphone may be treated as a sensor, and the signal obtained from the camera or the microphone can be referred to as sensing data or sensor information.

The input interface 120 can obtain a learning data for model learning and an input data to be used when an output is obtained by using learning model. The input interface 120 can obtain raw input data. In this situation, the processor 180 or the learning processor 130 can extract an input feature by preprocessing the input data.

In addition, the learning processor 130 can learn a model composed of an artificial neural network by using learning data. The learned artificial neural network can be referred to as a learning model. The learning model can be used to an infer result value for new input data rather than learning data, and the inferred value can be used as a basis for determination to perform a certain operation.

Figure 2:
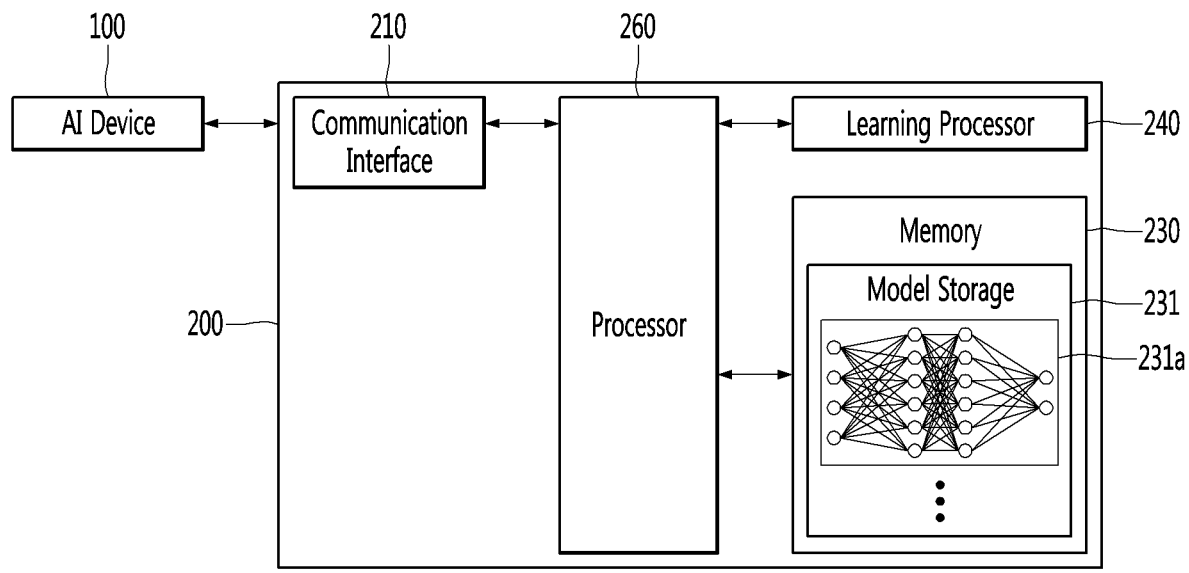
FIG. 2 illustrates an AI server 200 according to an embodiment of the present disclosure.

Further, the learning processor 130 can perform AI processing together with the learning processor 240 of the AI server 200 (FIG. 2). Further, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 can obtain at least one of internal information about the AI device 100, ambient environment information about the AI device 100, and user information by using various sensors. Examples of the sensors included in the sensor 140 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

In addition, the output interface 150 can generate an output related to a visual sense, an auditory sense, or a haptic sense. Further, the output interface 150 may include a display for outputting time information, a speaker for outputting auditory information, and a haptic module for outputting haptic information.

The memory 170 can store data that supports various functions of the AI device 100. For example, the memory 170 can store input data obtained by the input interface 120, learning data, a learning model, a learning history, and the like. In addition, the processor 180 can determine at least one executable operation of the AI device 100 based on information determined or generated by using a data analysis algorithm or a machine learning algorithm. The processor 180 can also control the components of the AI device 100 to execute the determined operation.

To this end, the processor 180 can request, search, receive, or utilize data of the learning processor 130 or the memory 170. The processor 180 can also control the components of the AI device 100 to execute the predicted operation or the operation determined to be desirable among the at least one executable operation. When the connection of an external device is required to perform the determined operation, the processor 180 can generate a control signal for controlling the external device and may transmit the generated control signal to the external device.

In addition, the processor 180 can obtain intention information for the user input and determine the user's requirements based on the obtained intention information. The processor 180 can also obtain the intention information corresponding to the user input by using at least one of a speech to text (STT) engine for converting speech input into a text string or a natural language processing (NLP) engine for obtaining intention information of a natural language.

At least one of the STT engine or the NLP engine can be configured as an artificial neural network, at least part of which is learned according to the machine learning algorithm. At least one of the STT engine or the NLP engine can be learned by the learning processor 130, be learned by the learning processor 240 of the AI server 200, or be learned by their distributed processing.

In addition, the processor 180 can collect history information including the operation contents of the AI apparatus 100 or the user's feedback on the operation and store the collected history information in the memory 170 or the learning processor 130 or transmit the collected history information to the external device such as the AI server 200. The collected history information can be used to update the learning model.

Further, the processor 180 can control at least part of the components of AI device 100 to drive an application program stored in memory 170. Furthermore, the processor 180 may operate two or more of the components included in the AI device 100 in combination to drive the application program.

Next, FIG. 2 illustrates an AI server 200 according to an embodiment of the present disclosure. Referring to FIG. 2, the AI server 200 refers to a device that learns an artificial neural network by using a machine learning algorithm or uses a learned artificial neural network. The AI server 200 may include a plurality of servers to perform distributed processing, or may be defined as a 5G network. Further, the AI server 200 may be included as a partial configuration of the AI device 100, and may perform at least part of the AI processing together.

The AI server 200 may include a communication interface 210, a memory 230, a learning processor 240, a processor 260, and the like. The communication interface 210 can transmit and receive data to and from an external device such as the AI device 100. The memory 230 may include a model storage 231. The model storage 231 can store a learning or learned model (or an artificial neural network 231*a*) through the learning processor 240.

Further, the learning processor 240 can learn the artificial neural network 231*a* by using the learning data. The learning model may be used in a state of being mounted on the AI server 200 of the artificial neural network, or may be used in a state of being mounted on an external device such as the AI device 100.

In addition, the learning model may be implemented in hardware, software, or a combination of hardware and software. If all or part of the learning models are implemented in software, one or more instructions that constitute the learning model may be stored in memory 230. The processor 260 can also infer the result value for new input data by using the learning model and may generate a response or a control command based on the inferred result value.

Figure 3:
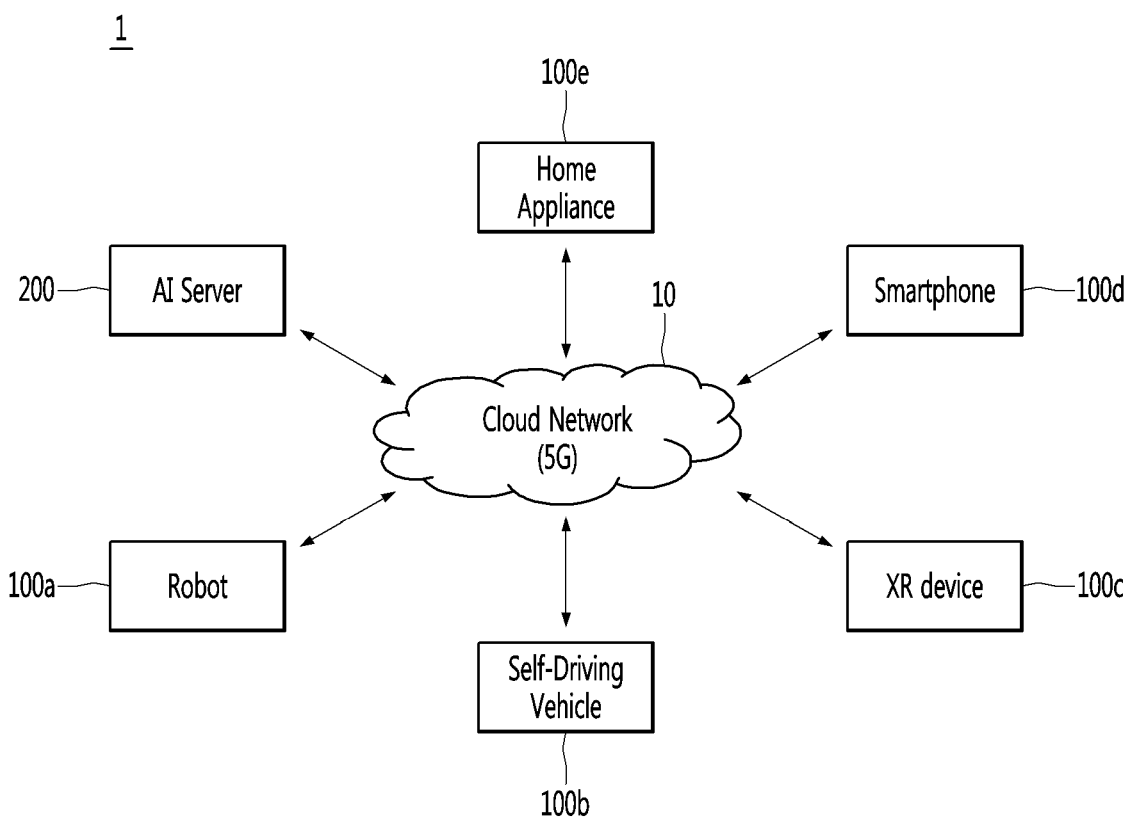
FIG. 3 illustrates an AI system 1 according to an embodiment of the present disclosure.

Next, FIG. 3 illustrates an AI system 1 according to an embodiment of the present disclosure. Referring to FIG. 3, in the AI system 1, at least one of an AI server 200, a robot 100*a*, a self-driving vehicle 100*b*, an XR device 100*c*, a smartphone 100*d*, or a home appliance 100*e* is connected to a cloud network 10. The robot 100*a*, the self-driving vehicle 100*b*, the XR device 100*c*, the smartphone 100*d*, or the home appliance 100*e*, to which the AI technology is applied, can be referred to as AI devices 100*a* to 100*e*.

In addition, the cloud network 10 refers to a network that forms part of a cloud computing infrastructure or exists in a cloud computing infrastructure. The cloud network 10 may be configured by using a 3G network, a 4G or LTE network, or a 5G network. That is, the devices 100*a* to 100*e* and 200 configuring the AI system 1 can be connected to each other through the cloud network 10. In particular, each of the devices 100*a* to 100*e* and 200 may communicate with each other through a base station, but may directly communicate with each other without using a base station.

Further, the AI server 200 may include a server that performs AI processing and a server that performs operations on big data. The AI server 200 can be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and assist at least part of AI processing of the connected AI devices 100*a* to 100*e*.

Further, the AI server 200 can learn the artificial neural network according to the machine learning algorithm instead of the AI devices 100*a* to 100*e*, and directly store the learning model or transmit the learning model to the AI devices 100*a* to 100*e*. In addition, the AI server 200 can receive input data from the AI devices 100*a* to 100*e*, infer the result value for the received input data by using the learning model, generate a response or a control command based on the inferred result value, and transmit the response or the control command to the AI devices 100*a* to 100*e*.

Alternatively, the AI devices 100*a* to 100*e* can infer the result value for the input data by directly using the learning model, and generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like. The robot 100*a* may include a robot control module for controlling the operation, and the robot control module refers to a software module or a chip implementing the software module by hardware.

Further, the robot 100*a* can obtain state information about the robot 100*a* by using sensor information obtained from various kinds of sensors, detect (recognize) surrounding environment and objects, generate map data, determine the route and the travel plan, determine the response to user interaction, or determine the operation. The robot 100*a* can also use the sensor information obtained from at least one sensor among the lidar, the radar, and the camera to determine the travel route and the travel plan.

In addition, the robot 100*a* can perform the above-described operations by using the learning model composed of at least one artificial neural network. For example, the robot 100*a* can recognize the surrounding environment and the objects by using the learning model, and determine the operation by using the recognized surrounding information or object information. The learning model may also be learned directly from the robot 100*a* or be learned from an external device such as the AI server 200.

Further, the robot 100*a* can perform the operation by generating the result by directly using the learning model, but the sensor information may be transmitted to the external device such as the AI server 200 and the generated result may be received to perform the operation. The robot 100*a* may also use at least one of the map data, the object information detected from the sensor information, or the object information obtained from the external apparatus to determine the travel route and the travel plan, and control the driver such that the robot 100*a* travels along the determined travel route and travel plan.

Further, the map data may include object identification information about various objects arranged in the space in which the robot 100*a* moves. For example, the map data may include object identification information about fixed objects such as walls and doors and movable objects such as pollen and desks. In addition, the object identification information may include a name, a type, a distance, and a position.

In addition, the robot 100*a* can perform the operation or travel by controlling the driver based on the control/interaction of the user. Further, the robot 100*a* can obtain the intention information of the interaction due to the user's operation or speech utterance, and determine the response based on the obtained intention information, and may perform the operation.

<AI+Self-Driving>

The self-driving vehicle 100*b*, to which the AI technology is applied, may be implemented as a mobile robot, a vehicle, an unmanned flying vehicle, or the like. The self-driving vehicle 100*b* may include a self-driving control module for controlling a self-driving function, and the self-driving control module refers to a software module or a chip implementing the software module by hardware. The self-driving control module may be included in the self-driving vehicle 100b as a component thereof, but may be implemented with separate hardware and connected to the outside of the self-driving vehicle 100b.

In addition, the self-driving vehicle 100b can obtain state information about the self-driving vehicle 100b by using sensor information obtained from various kinds of sensors, detect (recognize) surrounding environment and objects, generate map data, determine the route and the travel plan, or determine the operation. Like the robot 100a, the self-driving vehicle 100b can use the sensor information obtained from at least one sensor among the lidar, the radar, and the camera to determine the travel route and the travel plan.

In particular, the self-driving vehicle 100b can recognize the environment or objects for an area covered by a field of view or an area over a certain distance by receiving the sensor information from external devices, or receive directly recognized information from the external devices.

Further, the self-driving vehicle 100b can perform the above-described operations by using the learning model composed of at least one artificial neural network. For example, the self-driving vehicle 100b can recognize the surrounding environment and the objects by using the learning model, and determine the traveling movement line by using the recognized surrounding information or object information. The learning model can also be learned directly from the self-driving vehicle 100a or be learned from an external device such as the AI server 200.

Further, the self-driving vehicle 100b can perform the operation by generating the result by directly using the learning model, but the sensor information may be transmitted to the external device such as the AI server 200 and the generated result may be received to perform the operation. The self-driving vehicle 100b may use at least one of the map data, the object information detected from the sensor information, or the object information obtained from the external apparatus to determine the travel route and the travel plan, and may control the driver such that the self-driving vehicle 100b travels along the determined travel route and travel plan.

In addition, the map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may also include a name, a type, a distance, and a position.

In addition, the self-driving vehicle 100b can perform the operation or travel by controlling the driver based on the control/interaction of the user. Further, the self-driving vehicle 100b can obtain the intention information of the interaction due to the user's operation or speech utterance, and determine the response based on the obtained intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c can analyze three-dimensional point cloud data or image data obtained from various sensors or the external devices, generate position data and attribute data for the three-dimensional points, obtain information about the surrounding space or the real object, and render to output the XR object to be output. For example, the XR device 100c can output an XR object including the additional information about the recognized object in correspondence to the recognized object.

The XR device 100c can also perform the above-described operations by using the learning model composed of at least one artificial neural network. For example, the XR device 100c can recognize the real object from the three-dimensional point cloud data or the image data by using the learning model, and provide information corresponding to the recognized real object. The learning model can also be directly learned from the XR device 100c, or be learned from the external device such as the AI server 200. Further, the XR device 100c can perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like. The robot 100a, to which the AI technology and the self-driving technology are applied, refers to the robot itself having the self-driving function or the robot 100a interacting with the self-driving vehicle 100b.

The robot 100a having the self-driving function can collectively refer to a device that moves for itself along the given movement line without the user's control or moves for itself by determining the movement line by itself. The robot 100a and the self-driving vehicle 100b having the self-driving function may use a common sensing method to determine at least one of the travel route or the travel plan. For example, the robot 100a and the self-driving vehicle 100b having the self-driving function may determine at least one of the travel route or the travel plan by using the information sensed through the lidar, the radar, and the camera.

In addition, the robot 100a that interacts with the self-driving vehicle 100b exists separately from the self-driving vehicle 100b and can perform operations interworking with the self-driving function of the self-driving vehicle 100b or interworking with the user who rides on the self-driving vehicle 100b. Further, the robot 100a interacting with the self-driving vehicle 100b can control or assist the self-driving function of the self-driving vehicle 100b by obtaining sensor information on behalf of the self-driving vehicle 100b and providing the sensor information to the self-driving vehicle 100b, or by obtaining sensor information, generating environment information or object information, and providing the information to the self-driving vehicle 100b.

Alternatively, the robot 100a interacting with the self-driving vehicle 100b can monitor the user boarding the self-driving vehicle 100b, or control the function of the self-driving vehicle 100b through the interaction with the user. For example, when it is determined that the driver is in a drowsy state, the robot 100a can activate the self-driving function of the self-driving vehicle 100b or assist the control of the driver of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b can provide information or assist the function to the self-driving vehicle 100b outside the self-driving vehicle 100b. For example, the robot 100a can provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like. The robot 100a, to which the XR technology is applied, refers to a robot that is subjected to control/interaction in an XR image. In this situation, the robot 100a may be separated from the XR device 100c and interwork with each other.

When the robot 100a, which is subjected to control/interaction in the XR image, can obtain the sensor information from the sensors including the camera, the robot 100a or the XR device 100c can generate the XR image based on the sensor information, and the XR device 100c can output the generated XR image. In addition, the robot 100a can operate based on the control signal input through the XR device 100c or the user's interaction. For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like. The self-driving driving vehicle 100b, to which the XR technology is applied, refers to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image can obtain the sensor information from the sensors including the camera and output the generated XR image based on the obtained sensor information. For example, the self-driving vehicle 100b may include an HUD to output an XR image, thereby providing a passenger with a real object or an XR object corresponding to an object in the screen.

Further, when the XR object is output to the HUD, at least part of the XR object can be output to overlap the actual object to which the passenger's gaze is directed. Meanwhile, when the XR object is output to the display provided in the self-driving vehicle 100b, at least part of the XR object can be output to overlap the object in the screen. For example, the self-driving vehicle 100b can output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, obtains the sensor information from the sensors including the camera, the self-driving vehicle 100b or the XR device 100c can generate the XR image based on the sensor information, and the XR device 100c can output the generated XR image. The self-driving vehicle 100b can also operate based on the control signal input through the external device such as the XR device 100c or the user's interaction.

Next, FIGS. 4 to 8 illustrate diagrams for describing an artificial intelligence (AI) cooking device according to an embodiment of the present disclosure. Hereinafter, an artificial intelligence cooking device will be described with an example of an induction heating cooking device.

The induction heating cooking device is an electric cooking device that performs a cooking function by a scheme in which a high-frequency current flows through a working coil or a heating coil, and while a strong magnetic force line generated therefrom passes through a load (or cooking vessel), an eddy current flows to heat the vessel itself. In a basic heating principle of such an induction heating cooking device, as a current is applied to the heating coil, a heating load, which is a magnetic material, generates a heat by induction heating, and the heating load itself is heated by the heat thus generated to perform cooking.

An inverter used in an induction heating cooking device switches a voltage applied to the heating coil such that a high frequency current flows through the heating coil. The inverter typically drives a switching element composed of an insulated gate bipolar transistor (IGBT), which allows a high-frequency current to flow through the heating coil to form a high-frequency magnetic field around the heating coil.

Figure 4:
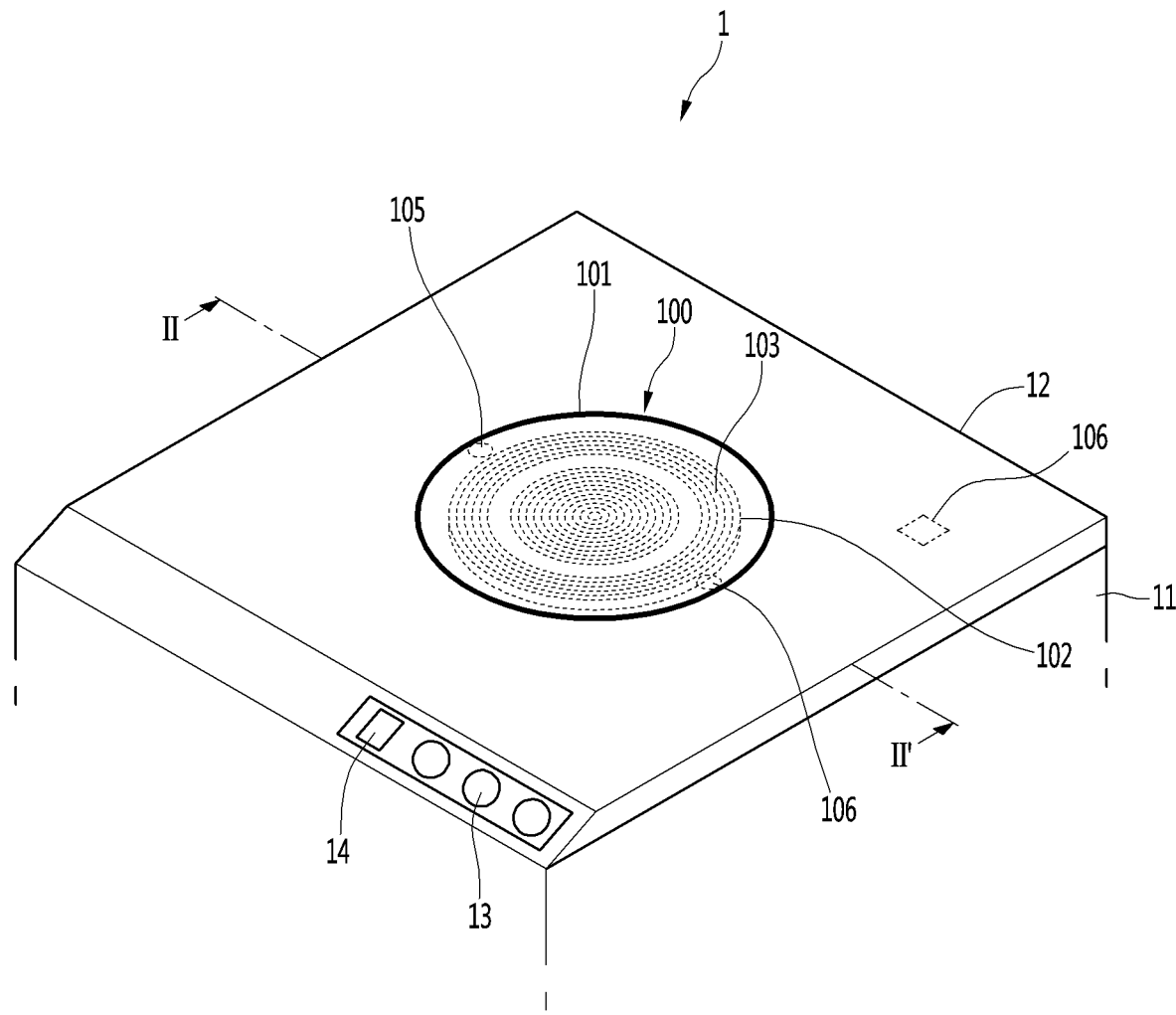
FIG. 4 is a perspective view of an induction heating cooking device according to an embodiment of the present disclosure.

FIG. 4 is a perspective view of an induction heating cooking device 1000 according to an embodiment of the present disclosure. The induction heating cooking device 1000 includes a main body 11, a plate 12, a heating region in which the heating load may be seated and heated on the plate 12, and a manipulation portion 13 for controlling an operation of the induction heating cooking device 1000 by a user. In addition, the plate 12 may be an upper plate forming an upper outer surface of the main body.

Referring to FIG. 4, the induction heating cooking device 1000 includes a main body 11 for defining an internal space therein in which a plurality of components are embedded. As shown, the main body 11 forms a lower outer surface of the induction heating cooking device 1000. The main body 11 may further include a heating portion 2000 that generates a magnetic field to provide a heat source.

Further, the main body 11 may also include a processor 180 for controlling the heating portion 2000 and a power supply 17 (FIG. 8) for supplying power to at least one of the heating portion 2000 or the processor 180. The processor 180 can also be operated based on a signal of the manipulation portion 13 to be described below. In addition, the processor 180 can transfer power of the power supply 17 to the heating portion 2000.

When power is supplied to the heating portion 2000, the cooking vessel put on the plate 12 can be heated by the magnetic field generated by the heating portion 2000. In addition, ingredients (e.g., water, food, or the like) contained in the cooking vessel can be cooked. Further, the cooking vessel may be at least partly made of a magnetic material such as iron, steel, or the like. In an example, the plate 12 can be formed to have a predetermined thickness and can also be formed of thermally tempered glass of a ceramic material to have a heat-resistant property.

In addition, a heating region 102 for cooking can be formed on an upper face of the plate 12 corresponding to the heating portion 2000. When the cooking vessel is seated on the heating region 102, the ingredients in the cooking vessel can be heated. Further, as shown in FIG. 4, the heating region 102 may be formed in a size corresponding to a size of the heating portion 2000.

As also shown in FIG. 4, a guideline 101 for guiding the cooking vessel to be seated on the heating region in place can be formed on the plate 12. In one example, when the heating portion 2000 includes a plurality of heating portions, the number of guidelines can correspond to the number of heating portions. Further, the guideline 101 may be formed in contact with an outer circumference line of the heating region or outside the outer circumference line.

In addition, the plate 12 can include the manipulation portion 13 that controls an operation of the processor 180. The manipulation portion 13 may be applied in a variety of ways, including buttons, knobs, touch screens, and the like. Thus, the user can set the induction heating cooking device 1000 to be suitable for a desired purpose using the manipulation portion 13. In one example, the user can determine a heating level (or heating intensity) of the heating portion 2000 using the manipulation portion 13. Then, the heating portion 2000 can be operated at the set heating level. In addition, the heating level of the heating portion 2000 can be determined by an intensity of the magnetic field applied to the heating portion 2000.

The plate 12 may further include a display 14 for displaying information and statuses of the heating portion 2000 and the load seated on the heating portion. The display 14 can also display information input to the manipulation portion 13. In one example, the display 14 can display the heating level of the heating portion 2000 set using the manipulation portion 13.

Further, the display 14 can display a message for the user to recognize when the cooking by the induction heating cooking device 1000 is stopped or an abnormality occurs in the state of the induction heating cooking device 1000. In an example, a vibration sensor module 106 can be disposed in a different region from the heating region 102 and detect a vibration of the plate 12. This will be described in detail below.

Figure 5:
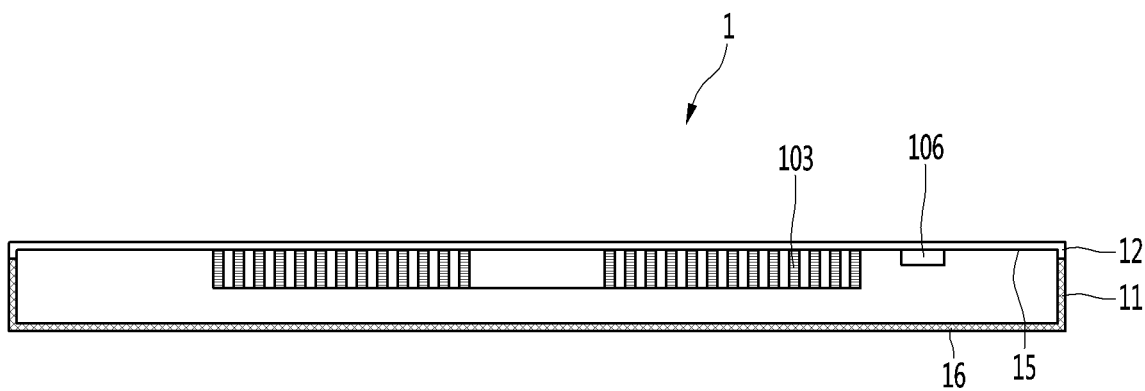
FIG. 5 is a cross-sectional view of II-II' in FIG. 4 according to an embodiment of the present disclosure.
Figure 8:
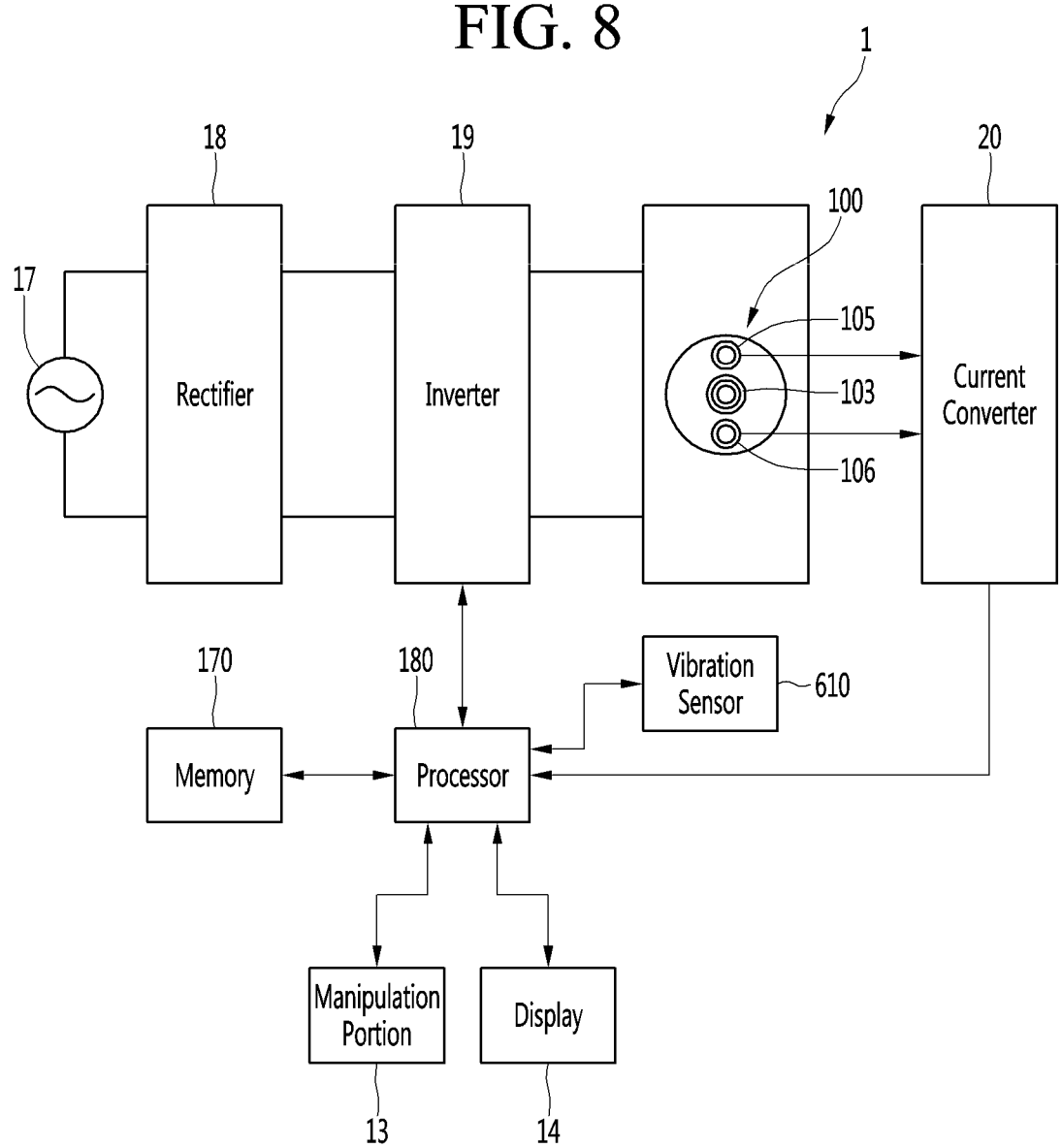
FIG. 8 is a simplified diagram illustrating a circuit configuration of an induction heating cooking device according to an embodiment of the present disclosure.

Next, FIG. 5 is a cross-sectional view of II-II' in FIG. 4, and FIG. 8 is a simplified diagram illustrating a circuit configuration of an induction heating cooking device 1000. As shown, the heating portion 2000 may include a working coil 103 that is an electrical induction heating element. When a current is applied to the working coil 103, a heating load, which is a magnetic material, generates heat, and then the heating load is heated by the generated heat to perform the cooking.

In an example, in order to supply the current to the working coil 103, the main body 11 may include a power conversion device for converting the power applied from the power supply 17 and supplying the converted power to the heating portion 2000. In addition, as shown in FIG. 8, the power conversion device may be an inverter 19. The inverter 19 can switch the voltage applied to the working coil 103. In addition, the high-frequency current can flow through the working coil 103 by the inverter 19.

Further, in order to supply power for driving the inverter 19, the main body 11 may further include a rectifier 18 for rectifying the power supplied from the power supply 17. In an example, the inverter 19 can be controlled by the processor 180 to switch the applied power.

In summary, the rectifier 18 can rectify the power supplied from the power supply 17 into the power to be supplied to the inverter 19. Further, the power rectified by the rectifier 18 can be applied to the inverter 19. In addition, the inverter 19 can switch the voltage applied to the working coil 103 such that a high-frequency current flows through the working coil 103. Therefore, the high-frequency magnetic field can be formed on the working coil 103. In addition, an eddy current can flow through the heating load seated in the heating region 102 to perform the cooking.

In addition, the vibration sensor module 106 can be disposed on a lower face of the plate 12. Further, the vibration sensor module 106 can be disposed in a region different from the heating region 102, that is, a region in which the heating portion is not disposed. In an example, when the cooking vessel is seated on the heating region 102 and vibrates, a vibration signal can be transmitted to the vibration sensor module 106 through the plate 12.

Figure 6:
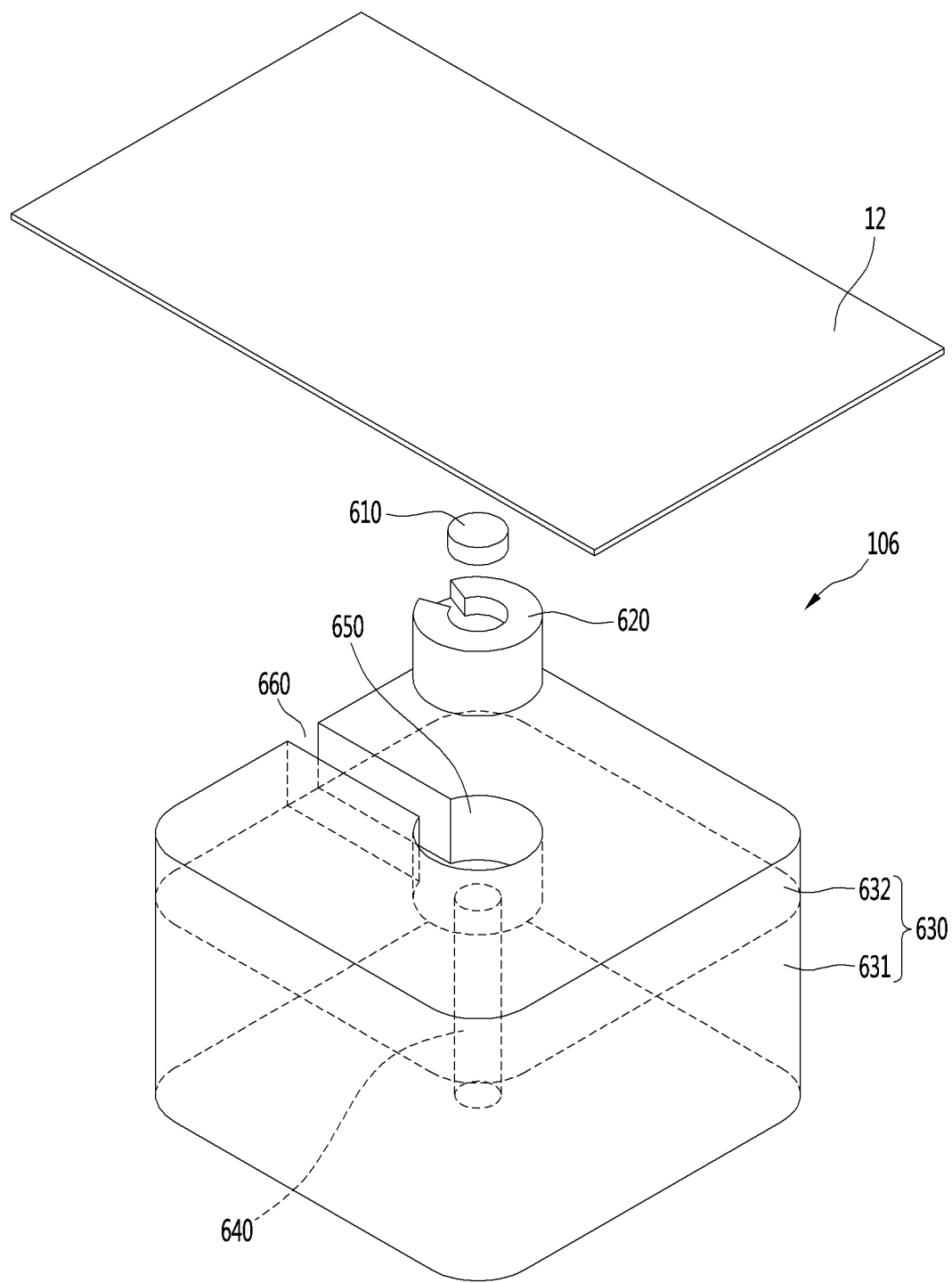
FIG. 6 is an exploded perspective view illustrating a vibration sensor module 106 according to an embodiment of the present disclosure.

In more detail, FIG. 6 is an exploded perspective view illustrating the vibration sensor module 106 according to a first embodiment of the present disclosure. FIG. 6 will be described with reference to FIG. 5.

The induction heating cooking device 1000 may include the vibration sensor module 106. As shown in FIG. 6, the vibration sensor module 106 may be accommodated in the internal space of the main body 11. Specifically, the vibration sensor module 106 may be disposed in a space defined between the plate 12 and the main body 11. Accordingly, the vibration sensor module 106 can minimize sensing of a vibration signal generated from the outside of the induction heating cooking device 1000. In an example, the vibration sensor module 106 may include a vibration sensor 610 and an outer holder 630.

The outer holder 630 may be disposed below the plate 12. In this situation, the outer holder 630 may be in contact with the lower face of the plate 12. Specifically, the outer holder 630 may be connected to and fixed to a lower face 15 (FIG. 5) of the plate 12. In this situation, an upper face of the outer holder 630 may be in contact with the lower face 15 of the plate 12. In an example, the induction heating cooking device 1000 may include a fastening member (not shown) for connecting and fixing the outer holder 630 to the lower face 15 of the plate 12.

In an example, it is described that the outer holder 630 is connected to and fixed to the lower face 15 of the plate 12, but is not limited thereto. The outer holder 630 may be spaced apart from the lower face 15 of the plate 12. In this situation, the induction heating cooking device 1000 may include a fastening member for connecting the plate 12 or the main body 11 to the outer holder 630 and supporting the outer holder 630.

In an example, the vibration sensor 610 may be accommodated in the outer holder 630. Further, the upper face of the outer holder 630 can be opened such that an upper face of the vibration sensor 610 faces the lower face 15 of the plate 12. In addition, the opening of the upper face of the outer holder 630 can mean opening of the entire upper face of the outer holder 630 or opening of a portion of the upper face of the outer holder 630.

In this situation, the upper face of the vibration sensor 610 can be spaced apart from the lower face 15 of the plate 12, or the upper face of the vibration sensor 610 can be in contact with the lower face 15 of the plate 12. In an example, the outer holder 630 surrounds side and lower portions of the vibration sensor 610. In addition, the outer holder 630 can be spaced apart from the vibration sensor 610 and surround the vibration sensor 610 or be in contact with the vibration sensor 610 and surround the vibration sensor 610. In addition, surrounding the side and lower portions of the vibration sensor 610 includes surrounding the entire side and lower portions of the vibration sensor 610 or surrounding a portion of the side and lower portions of the vibration sensor 610.

When the outer holder 630 is spaced apart from the vibration sensor 610 and surrounds the vibration sensor 610, the vibration sensor module 106 may further include a connector connected to the outer holder 630 and the vibration sensor 610 to support the vibration sensor 610. In an example, the vibration sensor module 106 may further include an inner holder 620 and a connector 640.

Further, the vibration sensor 610 may be accommodated in the inner holder 620. In this situation, the inner holder 620 may surround the side and lower portions of the vibration sensor 610. In addition, surrounding the side and lower portions of the vibration sensor 610 includes surrounding the entire side and lower portions of the vibration sensor 610 or surrounding a portion of the side and lower portions of the vibration sensor 610. In one example, the inner holder 620 may be made of an elastic material. Accordingly, the inner holder 620 can reduce transmission, to the vibration sensor 610, of the vibration signal other than the vibration signal received through the plate 12.

In addition, the outer holder 630 may have a hollow structure, and the inner holder 620 can be accommodated in an internal space of the outer holder 630. In this situation, the connector 640 can connect the outer holder 630 and the inner holder 620 and support the inner holder 620. In an example, the outer holder 630 may include a lower holder 631 and an upper holder 632.

As shown in FIG. 6, the upper holder 632 may include an accommodating portion 650 defined therein. In addition, the accommodating portion 650 may be in a hole shape. Further, the inner holder 620 can be accommodated in the accommodating portion 620. In an example, the lower holder 631 can have a hollow structure, and the connector 640 can be disposed in an internal space defined in the lower holder 631. The connector 640 can also be connected to the inner holder 620 and the lower holder 631 and support the inner holder 620.

In an example, an opening 660 may be defined in the inner holder 620 and the outer holder 630 for exposing a portion of the side and lower faces of the vibration sensor 610 to the outside of the vibration sensor module 106. In this situation, a wiring for connecting the vibration sensor 610 with the processor 180 through the opening 660 may be formed.

According to the present disclosure, the vibration sensor module 106 is accommodated in the internal space of the main body 11. Accordingly, sensing, by the vibration sensor 610, of the vibration signal (e.g., ambient noise due to use of a cutting board, a mixer, or the like) generated from the outside of the induction heating cooking device 1000 can be minimized.

Further, according to the present disclosure, the outer holder 630 for receiving the vibration sensor module 106 therein is connected to and fixed to the plate 12. Accordingly, sensing, by the vibration sensor 610, of a vibration signal (e.g., vibration transmitted by the main body 11) transmitted through a structure other than the plate 12 can be minimized.

In an example, according to the present disclosure, the outer holder 630 is disposed in close contact with the lower face 15 of the plate 12 and surrounds the side and the lower portions of the vibration sensor 610. Accordingly, the sensing, by the vibration sensor 610, of the vibration signal (e.g., ambient noise or the like due to use of a cutting board, a mixer, or the like) generated from the outside can be minimized.

Figure 7:
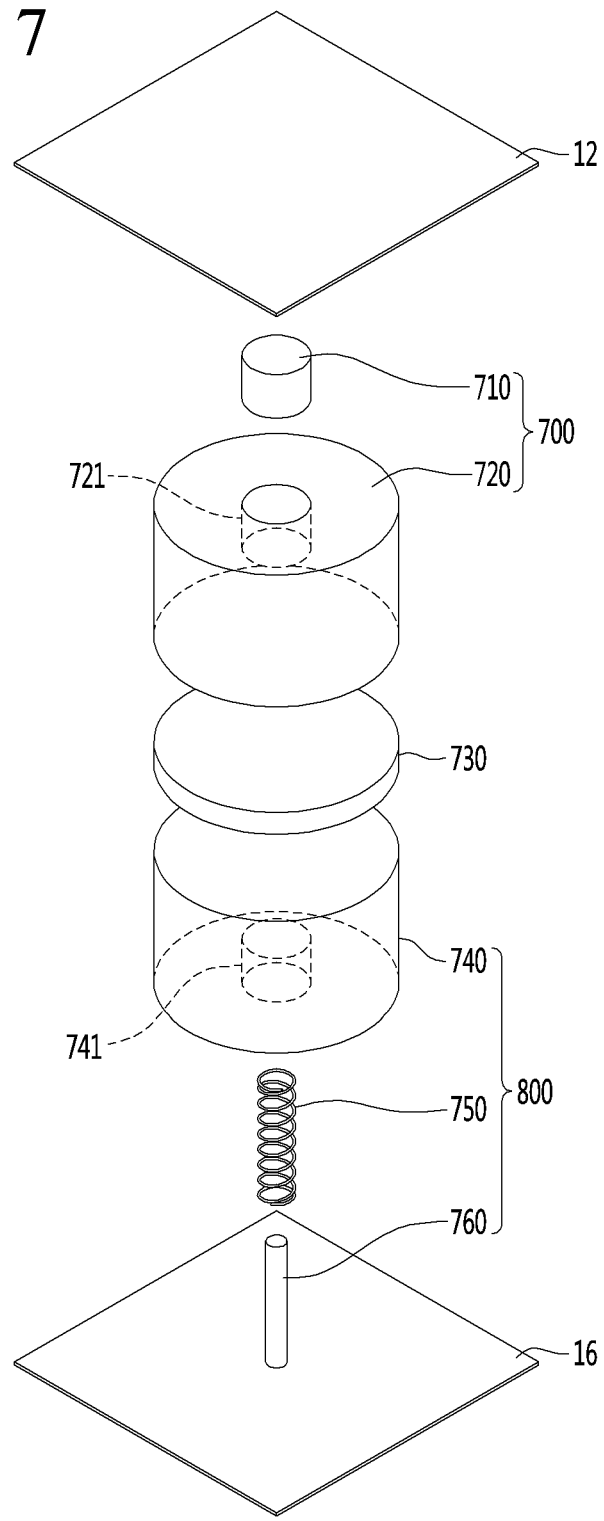
FIG. 7 is an exploded perspective view illustrating a vibration sensor module and a pressing mechanism according to another embodiment of the present disclosure.

Next, FIG. 7 is an exploded perspective view illustrating a vibration sensor module and a pressing mechanism according to another embodiment of the present disclosure. FIG. 7 will be described with reference to FIG. 5.

A vibration sensor module 700 may include a vibration sensor 710 and a housing 720 in which the vibration sensor is accommodated. The vibration sensor 710 can be accommodated in the housing 720. In more detail, the housing 720 may include an accommodating portion 721 defined therein, and the vibration sensor 710 can be accommodated in the accommodating portion 721.

Further, the housing 720 may surround side and lower portions of the vibration sensor 710. In addition, an upper face of the housing 720 can be opened such that an upper face of the vibration sensor 710 faces the lower face 15 of plate 12 In addition, the upper face of the vibration sensor 710 can be spaced apart from the lower face 15 of the plate 12 or the upper face of the vibration sensor 710 can be in contact with the lower face 15 of the plate 12. In one example, a pressing mechanism 800 may include a spring 750, a spring supporter 760, and a spring housing 740.

Further, the spring supporter 760 can be connected to a lower plate 16 of the main body 11. Further, the spring 750 may be mounted on the spring supporter 760. In this situation, the spring supporter 760 can support the spring 750 such that the spring 750 faces a direction of the upper plate 12. In an example, the spring housing 740 may include a spring accommodating portion 741 defined therein, and a portion of the spring 750 can be accommodated in the spring accommodating portion 741.

In addition, the pressing mechanism 800 can press the vibration sensor module 700 toward the upper plate 12. Specifically, the vibration sensor module 700 can be disposed above the spring housing 740, and a pressure by an elastic force of the spring 750 can act toward the upper plate 12. Further, the elastic force of the spring 750 can be transmitted to the vibration sensor module 700 to press the vibration sensor module 700 toward the upper plate 12. In addition, the vibration sensor module 700 can be directly connected with the pressing mechanism 800 or be indirectly connected with the pressing mechanism 800 with a vibration absorbing mechanism 730 therebetween.

In one example, the housing 720 may be disposed below the plate 12, and the housing 720 can be in contact with the lower face of plate 12 by pressing of the pressing mechanism 800. According to such a structure, transmission of the vibration signal to the vibration sensor 710 through routes other than the plate 12 can be minimized by contacting the housing with the plate 12 by the pressing of the pressing mechanism.

In addition, the vibration absorbing mechanism 730 may be composed of an elastic body such as rubber or the like. Further, the vibration absorbing mechanism 730 can absorb a vibration signal transmitted through the lower plate 16, thereby preventing the vibration signal from being transmitted to the vibration sensor 710.

Further, the artificial intelligence cooking device has been described with the example of the induction heating cooking device, but is not limited thereto. For example, the artificial intelligence cooking device described in the present disclosure can be applied to any product capable of heating the ingredients in the cooking vessel, such as a gas stove, an electric stove, an oven, a microwave oven, an induction, a hybrid, a highlight, and the like. The artificial intelligence cooking device may also include some or all of the components of the AI device 100 described in FIG. 1, and can perform a function performed by the AI device 100.

Figure 9:
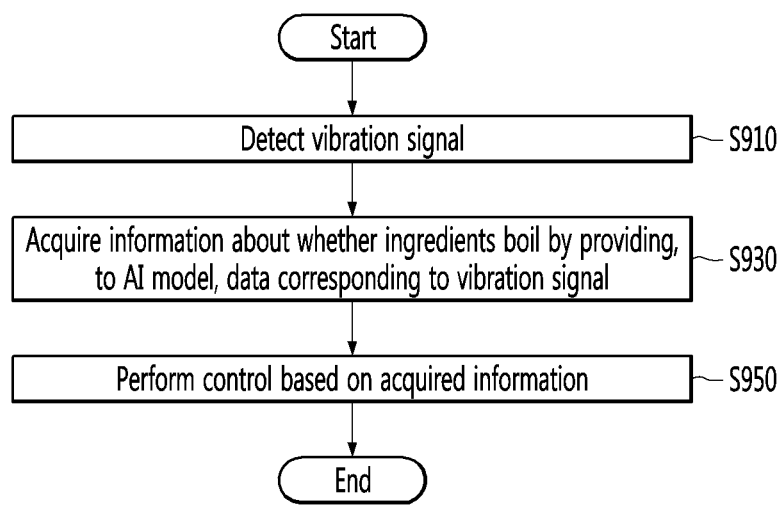
FIG. 9 is a diagram illustrating a method for operating an artificial intelligence cooking device according to an embodiment of the present disclosure.

Next, FIG. 9 is a diagram illustrating a method for operating an artificial intelligence cooking device according to an embodiment of the present disclosure. The method includes detecting the vibration signal of the ingredients in the cooking vessel (S910), providing data corresponding to the vibration signal to the AI model to obtain information about whether the ingredients in the cooking vessel are boiling (S930), and performing control based on the obtained information (S950).

First, the vibration signal is described. The vibration signal is a physical vibration generated as the ingredients in the cooking vessel are heated. Further, at least one of a vibration intensity, a frequency, or a pattern of the vibration signal may vary based on temperature of the ingredients in the cooking vessel. Accordingly, when the ingredients in the cooking vessel are boiling, the vibration signal exhibits unique properties.

In more detail, FIG. 10 illustrates 2D images of vibration signals when ingredients are boiling and of vibration signals when the ingredients are not boiling. In FIGS. 10a-10e, vibration signals of five samples with different sizes of cooking vessels, different types of ingredients, and different amounts of ingredients are illustrated as 2D images.

Further, left images are vibration signals generated by the ingredients when the ingredients are not boiling, and right images are vibration signals generated by the ingredients when the ingredients are boiling. For example, a left image of FIG. 10a is a vibration signal detected before water in a first cooking vessel boils and a right image of FIG. 10a is a vibration signal detected while the water contained in the first cooking vessel is boiling. In another example, a left image of FIG. 10b is a vibration signal detected before soup contained in a second cooking vessel boils and a right image of FIG. 10b is a vibration signal detected while the soup contained in the second cooking vessel is boiling.

Referring to FIG. 10, it can be seen that the vibration signal when the ingredients are boiling or when the ingredients are not boiling shows different properties. This is because at least one of the intensity, frequency, or pattern of the vibration varies based on the temperature of the ingredients in the cooking vessel. Therefore, when the property of the vibration signal is extracted and analyzed when the ingredients are boiling, it is possible to determine whether the ingredients are boiling with only the vibration signal.

Next, FIG. 11 includes diagrams illustrating a method for generating an AI model according to an embodiment of the present disclosure. First, artificial intelligence will be briefly described. Artificial intelligence (AI) is one field of computer engineering and information technology for studying a method of enabling a computer to perform thinking, learning, and self-development that can be performed by human intelligence and may denote that a computer imitates an intelligent action of a human.

In addition, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program. In more detail, machine learning includes a technology which studies and establishes a system for performing learning based on experiential data, performing prediction, and autonomously enhancing performance and algorithms relevant thereto. Algorithms of machine learning can use a method which establishes a specific model for obtaining prediction or decision based on input data, rather than a method of executing program instructions which are strictly predefined.

The term "machine learning" can be referred to as "machine learning." In machine learning, a number of machine learning algorithms for classifying data have been developed. Decision tree, Bayesian network, support vector machine (SVM), and artificial neural network (ANN) are representative examples of the machine learning algorithms.

In addition, the decision tree is an analysis method of performing classification and prediction by schematizing a decision rule into a tree structure. Further, the Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression. The ANN is a model which implements the operation principle of biological neuron and a connection relationship between neurons and is an information processing system where a plurality of neurons called nodes or processing elements are connected to one another in the form of a layer structure.

In addition, the ANN is a model used for machine learning and is a statistical learning algorithm inspired from a neural network (for example, brains in a central nervous system of animals) of biology in machine learning and cognitive science. In more detail, the ANN may denote all models where an artificial neuron (a node) of a network which is formed through a connection of synapses varies a connection strength of synapses through learning, thereby obtaining an ability to solve problems.

The term "ANN" can be referred to as "neural network." In addition, the ANN may include a plurality of layers, and each of the plurality of layers may include a plurality of neurons. In addition, the ANN may include a synapse connecting a neuron to another neuron.

Further, the ANN can be generally defined by the following factors: (1) a connection pattern between neurons of a different layer; (2) a learning process of updating a weight of a connection; and (3) an activation function for generating an output value from a weighted sum of inputs received from a previous layer. The ANN may asp include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as layer." The ANN may be categorized into single layer neural networks and multilayer neural networks, based on the number of layers. General single layer neural networks are configured with an input layer and an output layer.

Further, general multilayer neural networks are configured with an input layer, at least one hidden layer, and an output layer. The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron can be activated and may output an output value obtained through an activation function.

In addition, the DNN including a plurality of hidden layers between an input layer and an output layer may be a representative ANN which implements deep learning which is a kind of machine learning technology. The term "deep learning" can be referred to as "deep learning."

In addition, the ANN can be trained by using training data. Here, training can denote a process of determining a parameter of the ANN, for achieving purposes such as classifying, regressing, or clustering input data. A representative example of a parameter of the ANN includes a weight assigned to a synapse or a bias applied to a neuron. An ANN trained based on training data can also classify or cluster input data, based on a pattern of the input data.

In this specification, an ANN trained based on training data can be referred to as a trained model. Next, a learning method of an ANN will be described. The learning method of the ANN can be largely classified into supervised learning, unsupervised learning, semi-supervised learning, and reinforcement learning.

Further, the supervised learning may be a method of machine learning for analogizing one function from training data. Moreover, in analogized functions, a function of outputting continual values can be referred to as regression, and a function of predicting and outputting a class of an input vector may be referred to as classification.

In the supervised learning, an ANN can be trained in a state where a label of training data is assigned. Here, the label can denote a right answer (or a result value) to be inferred by an ANN when training data is input to the ANN. In this specification, a right answer (or a result value) to be inferred by an ANN when training data is input to the ANN may be referred to as a label or labeling data.

In addition, in this specification, a process of assigning a label to training data for learning of an ANN can be referred to as a process which labels labeling data to training data. In this situation, training data and a label corresponding to the training data can configure one training set and may be inputted to an ANN in the form of training sets.

Training data can represent a plurality of features, and a label being labeled to training data may denote that the label is assigned to a feature represented by the training data. In this situation, the training data may represent a feature of an input object as a vector type.

An ANN can analogize a function corresponding to an association relationship between training data and labeling data by using the training data and the labeling data. In addition, a parameter of the ANN can be determined (optimized) through evaluating the analogized function.

The unsupervised learning is a kind of machine learning, and in this situation, a label may not be assigned to training data. In detail, the unsupervised learning can be a learning method of training an ANN to detect a pattern from training data itself and classify the training data, rather than to detect an association relationship between the training data and a label corresponding to the training data.

Examples of the unsupervised learning include clustering and independent component analysis. In this specification, the term "clustering" can be referred to as "clustering." Examples of an ANN using the unsupervised learning include a generative adversarial network (GAN) and an autoencoder (AE).

The GAN is a method of improving performance through competition between two different AIs called a generator and a discriminator. In this situation, the generator is a model for creating new data and generates new data, based on original data. Moreover, the discriminator is a model for recognizing a pattern of data and determines whether inputted data is original data or fake data generated from the generator.

Moreover, the generator can be trained by receiving and using data which does not deceive the discriminator, and the discriminator can be trained by receiving and using deceived data generated by the generator. Therefore, the generator can evolve to deceive the discriminator as much as possible, and the discriminator can evolve to distinguish original data from data generated by the generator.

The AE is a neural network for reproducing an input as an output. The AE may include an input layer, at least one hidden layer, and an output layer. In this situation, the number of node of the hidden layer may be smaller than the number of nodes of the input layer, and thus, a dimension of data can be reduced, whereby compression or encoding can be performed.

In addition, data output from the hidden layer can enter the output layer. In this situation, the number of nodes of the output layer may be larger than the number of nodes of the hidden layer, and thus, a dimension of the data may increase, and thus, decompression or decoding can be performed.

The AE can control the connection strength of a neuron through learning, and thus, input data can be expressed as hidden layer data. In the hidden layer, information can be expressed by using a smaller number of neurons than those of the input layer, and input data being reproduced as an output can denote that the hidden layer detects and expresses a hidden pattern from the input data.

The semi-supervised learning is a kind of machine learning and can denote a learning method which uses both training data with a label assigned thereto and training data with no label assigned thereto. As a type of semi-supervised learning technique, there is a technique which infers a label of training data with no label assigned thereto and performs learning by using the inferred label, and such a technique can be usefully used for a case where the cost expended in labeling is large.

The reinforcement learning can be a theory where, when an environment where an agent is capable of determining an action to take at every moment is provided, the best way is obtained through experience without data. The reinforcement learning can be performed by a Markov decision process (MDP).

To describe the MDP, firstly an environment where pieces of information needed for taking a next action of an agent can be provided, secondly an action which is to be taken by the agent in the environment can be defined, thirdly a reward provided based on a good action of the agent and a penalty provided based on a poor action of the agent can be defined, and fourthly an optimal policy can be derived through experience which is repeated until a future reward reaches a highest score.

A structure of the artificial neural network can be specified by a model composition, an activation function, a loss function or cost function, a learning algorithm, an optimization algorithm, or the like, a hyperparameter may be preset before learning, and then a model parameter is set through the learning to specify a model. A structure of the artificial neural network may be specified by a model composition, an activation function, a loss function or cost function, a learning algorithm, an optimization algorithm, or the like, a hyperparameter may be preset before learning, and then a model parameter is set through the learning to specify a model.

For example, elements for determining the structure of the artificial neural network may include the number of hidden layers, the number of hidden nodes included in each hidden layer, an input feature vector, a target feature vector, and the like. The hyperparameter includes various parameters that are set initially for the learning, such as an initial value or the like of the model parameter. In addition, the model parameter includes various parameters to be determined through the learning.

For example, the hyperparameter may include an initial weight value between nodes, an initial bias value between nodes, a mini-batch size, the number of the learning repetitions, a learning rate, or the like. In addition, the model parameter may include a weight value between nodes and a bias value between nodes.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function. The loss function may mainly use a mean squared error (MSE) or a cross entropy error (CEE), but the present disclosure is not limited thereto.

The CEE can be used when a correct answer label is one-hot encoded. One-hot encoding is an encoding method for setting a correct answer label value to 1 for only neurons corresponding to a correct answer and setting a correct answer label to 0 for neurons corresponding to a wrong answer. A learning optimization algorithm can be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state. The direction of adjusting model parameters is referred to as a step direction and the size of adjustment is referred to as a step size.

In this situation, the step size can mean the learning rate. The gradient descent scheme can obtain a slope by partial-differentiate the loss function with each model parameter, and can change the model parameters by the learning rate in an obtained gradient direction to update the model parameters. The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to obtain a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results. The AI model according to an embodiment of the present disclosure can be trained to predict whether the ingredients are boiling or can be trained to predict the temperature of the ingredients.

First, a method for training the AI model to predict whether the ingredients are boiling will be described. The training apparatus 200 can train a neural network 1110 by labeling information on whether the ingredients are boiling on data corresponding to the vibration signal.

Specifically, the training apparatus 200 can detect the vibration signal using the vibration sensor and convert the detected vibration signal into the data corresponding to the vibration signal. In addition, the training apparatus 200 can train the neural network using, as an input value, the data corresponding to the vibration signal and using, as an output value, a status of the ingredients (ingredients are boiling or not boiling) when the vibration signal is generated. In addition, the status of the ingredients (ingredients are boiling or not boiling) may be a correct answer that the neural network should infer using the data corresponding to the vibration signal.

Therefore, the training apparatus 200 can provide, to the neural network, the information on whether the ingredients are boiling (boiling or not boiling) labeled on the data corresponding to the vibration signal. In this situation, the neural network can infer a function of a correlation between the data corresponding to the vibration signal and the information on whether the ingredients are boiling using the data corresponding to the vibration signal and the information on whether the ingredients are boiling (boiling or not boiling). Further, parameters (weight, bias, or the like) of the neural network can be determined (optimized) through an evaluation of the function inferred by the neural network.

In an example, the training apparatus 200 can train the neural network using data corresponding to a predetermined time period. Specifically, the vibration signal can be detected in time series while the ingredients are being heated. Therefore, the data corresponding to the vibration signal can also be data collected in time series.

In this situation, the training apparatus 200 can separate the data collected in time series in the predetermined time period and label the information on whether the ingredients are boiling on the separated data to train the neural network. For example, the training apparatus 200 can separate the data collected in time series on a 1 second basis. Then, the training apparatus 200 can label the information on whether the ingredients are boiling on data corresponding to a time period of 1 second to train the neural network, and then label the information on whether the ingredients are boiling on data corresponding to a next time period of 1 second to train the neural network.

In an example, the training apparatus 200 can train the neural network using various types of cooking vessel, various kinds of ingredients, vibration signals generated from various amounts of ingredients, and state of ingredients (ingredients are boiling or not boiling) when the vibration signal occurs.

In addition, the variety of types of the cooking vessels can mean that at least one of a shape, a form, a size, or a material of the cooking vessel is different. Further, the variety of the ingredients can mean that the ingredients (e.g., water, soup, steamed, jigae, porridge, stew, etc.) are different.

Further, the variety of amounts of the ingredients can mean that mass of volume of the ingredient is different. In an example, the training apparatus 200 can convert the vibration signal detected by the vibration sensor into vibration data, and train the neural network using the vibration data corresponding to the vibration signal. In this situation, the vibration data can represent the vibration signal in a variety of formats.

In one example, the vibration data can be data represented in a time domain by sampling the vibration signal. In another example, the vibration data can be data in which the vibration signal is sampled and then Fourier transformed to be represented in a frequency domain. In still another example, the vibration data can be data represented in the time domain by sampling and differentiating the vibration signal. In another example, the vibration data can be data represented in the frequency domain by sampling, differentiating, and fast Fourier transforming the vibration signal.

In another example, an image representing the properties (amplitude, frequency, pattern, etc.) of the vibration signal, for example, the 2D image shown in FIG. 10 can be used as training data provided to the neural network. That is, all kinds of data that can represent the properties (amplitude, frequency, pattern, etc.) of the vibration signal can be used as the training data of the neural network.

Next, a method for training the AI model to predict a temperature of the ingredients will be described with reference to FIG. 11b. Further, only differences from those described in FIG. 11a will be described. The training apparatus 200 can train the neural network 1120 using, as an input value, the data corresponding to the vibration signal and using, as an output value, a temperature of the ingredients when the vibration signal is generated. In addition, the temperature of the ingredients can be a correct answer that the neural network should infer using the data corresponding to the vibration signal.

Therefore, the training apparatus 200 can provide, to the neural network, temperature information labeled on the data corresponding to the vibration signal. In this situation, the neural network can infer a function of a correlation between the data corresponding to the vibration signal and the temperature information using the data corresponding to the vibration signal and the temperature information. Further, parameters (weight, bias, or the like) of the neural network can be determined (optimized) through an evaluation of the function inferred by the neural network.

Further, the training apparatus 200 can separate data collected in time series in the predetermined time period and label the temperature information on the separated data to train the neural network. In an example, the temperature may not be classified into classes, such as boiling or not boiling, but may be expressed as a consecutive value. Thus, the neural network can be trained using a regression algorithm.

In an example, a neural network trained in such manner can be referred to as an AI model. In an example, the AI model can be mounted in the artificial intelligence cooking device. Specifically, the AI model can be implemented in hardware, software, or a combination of the hardware and the software. Further, when a portion or an entirety of the AI model is implemented in the software, at least one instruction that configures the AI model can be stored in the memory 170 of the artificial intelligence cooking device.

In an example, when the neural network is trained using the data corresponding to the vibration signal, such data can be referred to as training data corresponding to the vibration signal.

Figure 12:
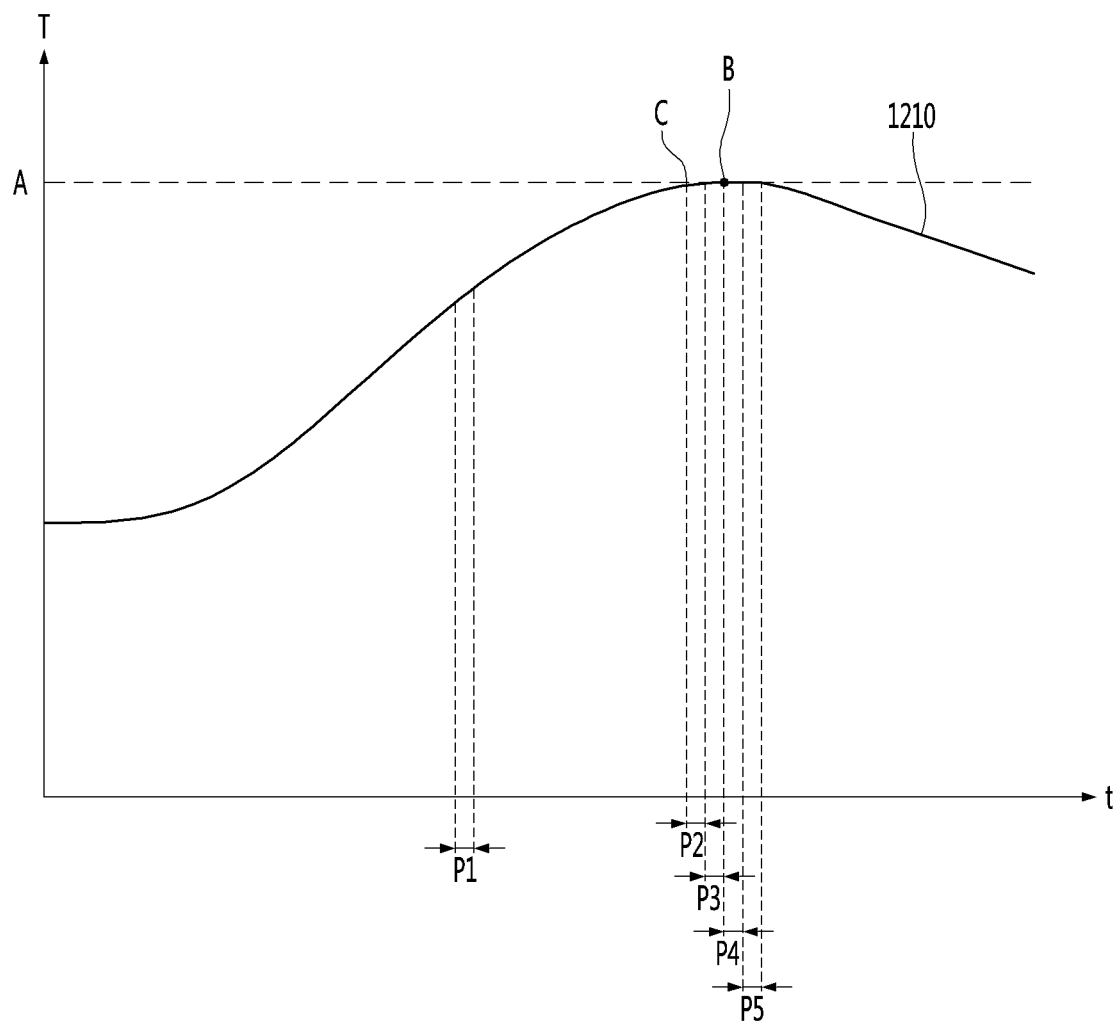
FIG. 12 is a view illustrating a method for determining whether ingredients in a cooking vessel are boiling, according to an embodiment of the present disclosure.

Next, FIG. 12 is a view illustrating a method for determining whether ingredients in a cooking vessel are boiling, according to an embodiment of the present disclosure. The vibration sensor 610 can detect the vibration signal of the ingredients in the cooking vessel. For example, the vibration sensor 610 can be a microphone. In addition, the vibration sensor 610 can detect a vibration signal transmitted through at least one of the cooking vessel, the plate 12, or air.

However, the vibration sensor 610 is not limited to the microphone. Further, various schemes capable of detecting the vibration of the ingredients in the cooking vessel can be used to drive the vibration sensor 610. In an example, the processor 180 can obtain the data corresponding to the vibration signal.

Specifically, the processor 180 can convert the vibration signal detected using the vibration sensor 610 into the data corresponding to the vibration signal. In addition, the data corresponding to the vibration signal may be the feature vector representing at least one of the intensity, frequency, and pattern of the vibration.

In this situation, the processor 180 can convert the vibration signal into data having the same format as the data used as the training data of the AI model. For example, when the AI model is generated using, as the training data, the data represented in the time domain by sampling the vibration signal, the processor 180 can sample the vibration signal detected by the vibration sensor 610 and convert the sampled vibration signal into the data represented in the time domain.

In an example, when the AI model is generated using the data in the predetermined time period as the training data, the processor 180 can provide the AI model with the data in the predetermined time domain. Specifically, the vibration signal can be detected in time series while the ingredients in the cooking vessel are heated. Therefore, the data corresponding to the vibration signal can also be the data collected in time series.

Further, the processor 180 can separate the data collected in time series in the predetermined time period. For example, when the AI model is generated using data corresponding to a time period of 1 second as the training data, the processor 180 can separate the data collected in time series on a 1 second basis, and then input the data corresponding to the time period of 1 second into the AI model.

In an example, a plurality of time periods may be consecutive, but is not limited thereto. The plurality of time periods may not be consecutive and may overlap each other. For example, when the plurality of time periods are consecutive, data corresponding to a first time period may be data corresponding to a vibration signal of a time period of 500 seconds to 501 seconds from a time when heating is started and data corresponding to a second time period may be data corresponding to a vibration signal of a time period of 501 seconds to 502 seconds from the time when heating is started.

In another example, when the plurality of time periods are not consecutive, data corresponding to the first time period may be data corresponding to the vibration signal of the time period of 500 seconds to 501 seconds from the time when the heating is started and data corresponding to the second time period may be data corresponding to a vibration signal of a time period of 502 seconds to 503 seconds from the time when the heating is started.

In still another example, when the plurality of time periods are overlapped with each other, data corresponding to the first time period may be data corresponding to the vibration signal of the time period of 500 seconds to 501 seconds from the time when the heating is started and data corresponding to the second time period may be data corresponding to a vibration signal of a time period of 500.5 seconds to 501.5 seconds from the time when the heating is started.

In an example, it was described that the data corresponding to the vibration signal is data collected in time series. Further, the processor 180 can provide the data corresponding to the vibration signal to the AI model in real time.

Specifically, when data corresponding to a predetermined time period is obtained, the processor 180 can input the data corresponding to the predetermined time period into the AI model in real time. For example, when the predetermined time period is assumed as 1 second, the processor can input data of a time period of 500 seconds to 501 seconds into the AI model as soon as the data of the time period of 500 seconds to 501 seconds is obtained and then can input data of a time period of 501 seconds to 502 seconds into the AI model as soon as the data of the time period of 501 seconds to 502 seconds is obtained.

In an example, the processor 180 can sequentially input data of a plurality of time periods into the AI model based on a time sequence of the plurality of time periods. For example, when the first time period is 500 seconds to 501 seconds, the second time period is 501 seconds to 502 seconds, and the third time period is 502 seconds to 503 seconds, the processor 180 can sequentially input data corresponding to the first time period, data corresponding to the second time period, and data corresponding to the third time period into the AI model.

In other words, according to the present disclosure, the data corresponding to the vibration signals are processed in real time and sequentially input into the AI model, so that the information on whether the ingredients are boiling can be obtained as soon as possible.

In an example, the processor 180 can provide the data corresponding to the vibration signal to the AI model to obtain the information on whether the ingredients in the cooking vessel are boiling. Specifically, the processor 180 can provide the data corresponding to the vibration signal to the AI model.

In addition, the AI model can be the neural network trained using the information on whether the ingredients are boiling as labeling data. In this situation, the AI model can output a result value, for example, a score or a probability corresponding to each of a plurality of classes (boiling/not boiling).

Then, the processor can obtain the information on whether the ingredients in the cooking vessel are boiling based on the result value output from the AI model using the data provided to the AI model. For example, when the AI model outputs a probability of 97% that the ingredients are boiling, the processor 180 can determine that the ingredients in the cooking vessel are boiling.

Next, a method for operating an artificial intelligence cooking device will be described in chronological order with reference to FIG. 12, which illustrates a change in temperature T of the ingredients over time t.

The processor 180 can input data corresponding to a first time period P1 into the AI model. In this situation, the AI model can output information (or a probability value) indicating that the ingredients are not boiling. Accordingly, the processor 180 can determine that the ingredients are not boiling. Then, the processor 180 can repeat such a process.

In addition, a temperature of the ingredients reached a boiling point A and started boiling at a certain time point B. Then, the processor 180 can input data corresponding to a fourth time period P4 into the AI model. In this situation, the AI model outputs a result value. Then, the processor 180 can determine that the ingredients in the cooking vessel are boiling based on a probability of boiling of the ingredients in the cooking vessel, which is equal to or higher than a predetermined value.

A following table shows an accuracy of the prediction of the AI model trained by variously combining four samples with vibration signals.

TABLE 1

|  | Condition A training data | Condition B training data | Condition C training data | Condition D training data | Total |
|---|---|---|---|---|---|
| Condition A test data | 96.10% | 97.07% | 98.13% | 97.72% | 97.80% |
| Condition B test data | 96.03% | 97.40% | 96.03% | 96.72% | 95.95% |
| Condition C test data | 93.27% | 96.54% | 97.12% | 97.79% | 97.60% |
| Condition D test data | 95.31% | 97.08% | 97.17% | 98.32% | 97.43% |
| Total | 95.27% | 97.05% | 97.09% | 97.60% | 97.15% |

Referring to Table 1, condition A training data means that the neural network was trained using a vibration signal obtained under a condition A (e.g., 500 ml of water). Further, condition B training data means that the neural network was trained using a vibration signal obtained under a condition B (e.g., 1000 ml of soup).

Further, condition A test data means that the vibration signal obtained under the condition A was input into the trained neural network to measure the accuracy. Further, condition B test data means that the vibration signal obtained under the condition B was input into the trained neural network to measure the accuracy.

Referring to Table 1, a tendency that shows a high accuracy is obtained when the vibration signal of the condition A is input to the neural network trained using the vibration signal of the condition A (96.10% accuracy), when the vibration signal of the condition B is input to the neural network trained using the vibration signal of the condition B (97.40% accuracy), when a vibration signal of a condition C is input to a neural network trained using the vibration signal of the condition C (97.12% accuracy), and when a vibration signal of a condition D is input to a neural network trained using the vibration signal of the condition D (98.32% accuracy). This can mean that the neural network is trained using the training data, so that the parameters (weight, bias, or the like) of the neural network are optimized.

Further, referring to Table 1, a tendency that shows a high accuracy is obtained when the vibration signal of the condition A is input to a neural network trained using the vibration signals of the conditions A, B, C, and D (97.80% accuracy), When the vibration signal of the condition B is input to the neural network trained using vibration signals of the conditions A, B, C, and D (95.95% accuracy), when the vibration signal of the condition C is input to the neural network trained using the vibration signals of the conditions A, B, C, and D (97.60% accuracy), and when the vibration signal of the condition D is input to the neural network trained using the vibration signals of the conditions A, B, C, and D (97.43% accuracy). This can mean that the neural network is trained using various training data, so that the parameters (weight, bias, or the like) of the neural network can be further optimized.

Further, referring to Table 1, when a test is performed by inputting the vibration signal of the condition A, the vibration signal of the condition B, the vibration signal of the condition C, and the vibration signal of the condition D to the neural network trained using the vibration signals of the conditions A, B, C, and D, a total accuracy was 97.15%. This indicates that the trained neural network can predict whether the ingredients are boiling with a very accurate probability in various situations.

As such, according to the present disclosure, since whether the ingredients are boiling is determined using the AI model, which learned the properties of the vibration (intensity, frequency, and pattern) generated by the boiling of the ingredients, the accuracy of the determination on whether the ingredients are boiling can be improved.

Further, according to the present disclosure, data of a predetermined time period (e.g., 1 second) is input to the AI model. Then, the AI model can determine whether the ingredients are boiling by considering only data of a current time period (that is, without considering data of a previous time period together). That is, the present disclosure can be much less likely to misjudge and show a higher accuracy in the determination on whether the ingredients are boiling, compared to U.S. Pat. No. 9,395,078, which detects boiling by extracting a property based on a change in vibration signals in a chronological order.

Further, according to the present disclosure, despite the change in the type of the ingredients, the type of the cooking vessel, the amount of the ingredients, or the like, the accurate prediction on whether the ingredients are boiling can be achieved. Further, according to the present disclosure, since the vibration signal only needs to be processed in a usual signal processing scheme and then input into the AI model, a processing algorithm can be simplified.

In an example, inputting data into the AI model continuously from a time period (e.g., P1) where a temperature is very low can add a processing load of the AI model. Accordingly, the processor 180 can provide the AI model with data corresponding to the vibration signal when the vibration intensity is greater than or equal to a certain level.

For example, the higher the temperature of the ingredients, the greater the intensity of the vibration. Further, when it is detected at a certain time point c that the intensity of the vibration is greater than or equal to the certain level, the processor 180 can input data corresponding to time periods P2, P3, P4, and P5 after the certain time point c into the AI model.

In an example, the processor 180 can input data of a plurality of consecutive time periods into the AI model and consider information obtained by inputting the data of the plurality of consecutive time periods into the AI model to determine that the ingredients in the cooking vessel are boiling. Specifically, the processor 180 can provide the data of the fourth time period P4 to the AI model to obtain first information on whether the ingredients in the cooking vessel are boiling.

Further, the processor 180 can provide data of a fifth time period P5, which is a next time period after the fourth time period P4, to the AI model to obtain second information on whether the ingredients in the cooking vessel are boiling. Further, the processor 180 can determine whether the ingredients in the cooking vessel boil using the first information and the second information.

Specifically, when the first information and the second information indicate that the ingredients in the cooking vessel are boiling, the processor 180 can determine that the ingredients in the cooking vessel are boiling. Further, when the first information indicates that the ingredients in the cooking vessel are boiling, but the second information indicates that the ingredients in the cooking vessel are not boiling, the processor 180 can determine that the ingredients in the cooking vessel are not boiling.

In an example, the processor 180 can provide data of a sixth time period, which is a next time period of the fifth time period P5, to the AI model with data of a sixth time period to obtain third information on whether the ingredients in the cooking vessel are boiling. Further, when the first information indicates that the ingredients in the cooking vessel are boiling, but the second information indicates that the ingredients in the cooking vessel are not boiling, the processor 180 can determine whether the ingredients in the cooking vessel are boiling using the second information and the third information. For example, when both the second information and the third information indicate that the ingredients in the cooking vessel are boiling, the processor 180 can determine that the ingredients in the cooking vessel are boiling.

It is assumed that the AI model has a probability of 97% of achieving the accurate prediction. 97% is a very high probability, but there is also a 3% probability of making a wrong prediction. However, according to the present disclosure, when all of the information obtained corresponding to the data of the plurality of consecutive time periods indicate that the ingredients in the cooking vessel are boiling, it is determined that the ingredients in the cooking vessel are boiling. Therefore, the accuracy of the prediction can be further improved. In an example, the processor 180 can perform control based on the information on whether the ingredients in the cooking vessel are boiling.

Figure 13:
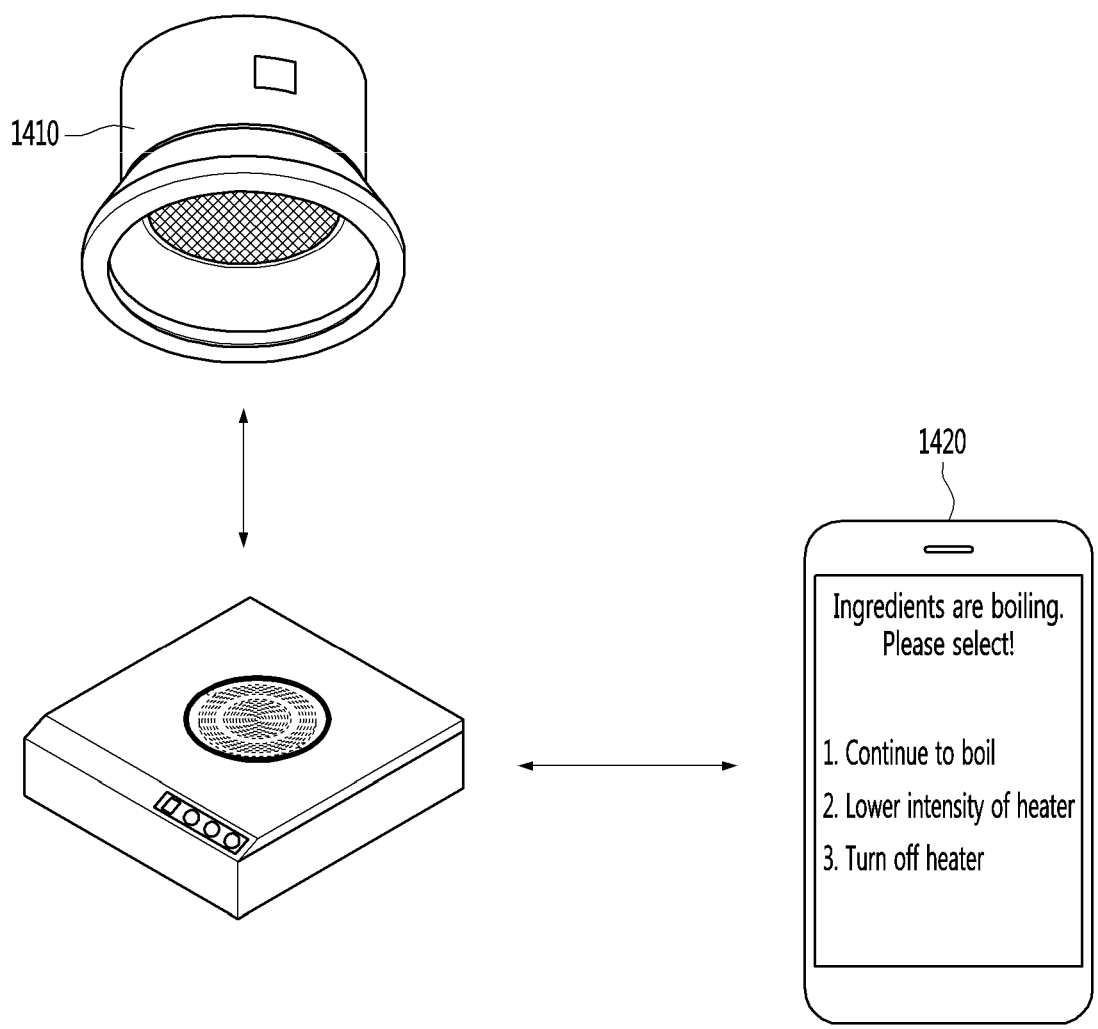
FIG. 13 is a view illustrating an operation of an artificial intelligence cooking device when ingredients are boiling, according to an embodiment of the present disclosure.

This will be described with reference to FIG. 13. FIG. 13 is a view illustrating an operation of an artificial intelligence cooking device when ingredients are boiling, according to an embodiment of the present disclosure.

When the ingredients in the cooking vessel boil are boiling, the processor can control the power conversion device such that the heating intensity of the heating portion is reduced or the heating operation of the heating portion is stopped. For example, when the power conversion device is the inverter 19, the processor 180 can control the inverter 19 to block the voltage applied to the heating portion (working coil) or to lower the voltage applied to the heating portion (working coil).

Further, the artificial intelligence cooking device may include the speaker. Further, when the ingredients in the cooking vessel are boiling, the processor 180 can output an alarm through the speaker. Further, the artificial intelligence cooking device can also operate in association with further devices. Specifically, the artificial intelligence cooking device can communicate with the further devices such as a mobile terminal 1420, a hood 1410, or the like.

Further, when the ingredients in the cooking vessel are boiling, the processor 180 can transmit a control command for operating the further devices. For example, when the ingredients in the cooking vessel are boiling, the processor 180 can transmit a control command for operating the hood 1410. Further, the processor 180 can transmit a notification to a further device and receive a control command from the further device.

For example, when the ingredients in the cooking vessel are boiling, the processor 180 can transmit a notification indicating that the ingredients in the cooking vessel are boiling to the mobile terminal 1420. Further, when a control command is received from the mobile terminal 1420 in response to the transmitted notification, the processor 180 can reduce the heating intensity of the heating portion or stop the operation of the heating portion based on the received control command.

As such, according to the present disclosure, since whether the ingredients are boiling is detected and the control is performed accordingly, the overflow of the ingredients, fire, or the like can be prevented and inconvenience of the user of constantly checking whether the ingredients are boiling can be prevented.

Next, a method for obtaining temperature information of the ingredients and obtaining information on whether the ingredients in the cooking vessel are boiling based on the temperature information of the ingredients will be described. The processor 180 can provide the data corresponding to the vibration signal to the AI model to obtain the information on whether the ingredients in the cooking vessel are boiling.

Specifically, the processor 180 can provide the data corresponding to the vibration signal to the AI model. In addition, the AI model may be the neural network trained using the temperature information of the ingredients as the labeling data. In this situation, the AI model can output the result value, for example, the temperature information of the ingredients.

Further, the processor can obtain the information on whether the ingredients in the cooking vessel are boiling based on the temperature information output by the AI model using the data provided to the AI model. For example, when the AI model outputs temperature information of 100° C., the processor 180 can determine that the ingredients in the cooking vessel are boiling.

In an example, when the AI model outputs the temperature information, the heating portion can be controlled before the ingredients are boiling. Specifically, the processor 180 can control the power conversion device such that the heating intensity of the heating portion is reduced or the heating operation of the heating portion is stopped when the temperature of the ingredients is higher than a preset value based on the temperature information.

Further, the preset value may be lower than a boiling point. For example, the processor 180 can control the power supply conversion device such that the heating intensity of the heating portion is reduced or the heating operation of the heating portion is stopped when the temperature of the ingredients is higher than 95° C. As such, according to the present disclosure, the temperature of the ingredients is predicted, thereby preventing the ingredients from boiling in advance.

In an example, the processor can control, using the temperature information output from the AI model and temperature information set by the user, the heating portion such that the ingredients maintain temperature information set by the user. Specifically, the processor can receive an input for setting the temperature information via the input interface.

Further, the processor can compare the temperature information set by the user with the temperature information output from the AI model and perform the control based on the comparison result to perform the control such that the ingredients to maintain the temperature information set by the user. For example, when the user sets temperature information to be 70° C. and the AI model outputs 75° C. of temperature information, the processor 180 can control the power conversion device to reduce the heating intensity.

In another example, when the user sets temperature information to be 70° C. and the AI model outputs 65° C. of temperature information, the processor 180 can control the power conversion device to increase the heating intensity. In another example, when the user sets temperature information of 100° C. for 10 minutes and then of 70° C. for the next 10 minutes, the processor 180 can control the power conversion device based on the temperature information set by the user and the temperature information output from the AI model.

Recently, in addition to a cooking scheme of simple boiling, a cooking scheme such as a sous vide scheme or the like in which maintenance of a constant temperature is important has emerged. Further, according to the present disclosure, cooking in accordance with various cooking schemes can be performed by only setting the temperature by the user.

Figure 14:
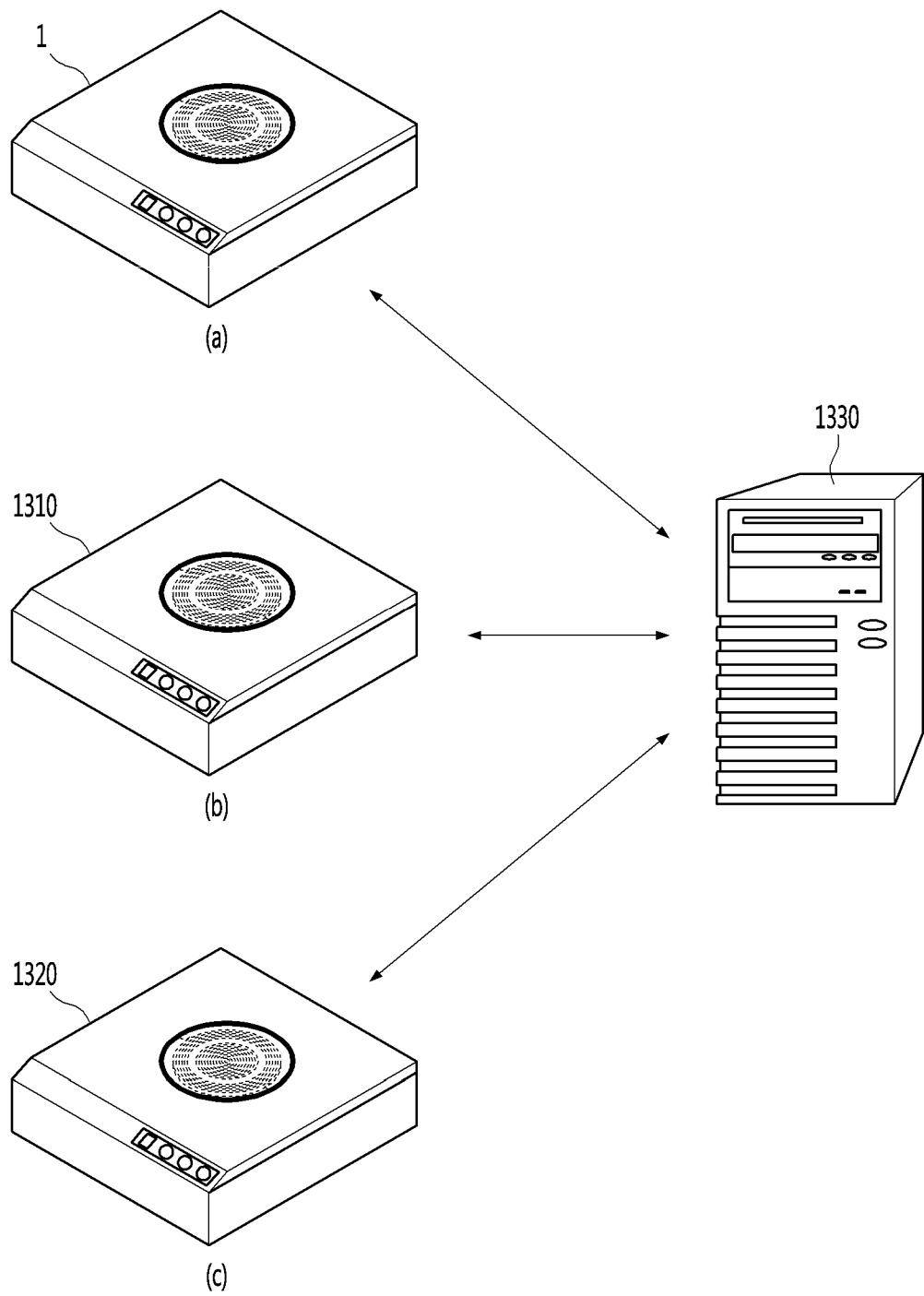
FIG. 14 is a diagram illustrating a method for operating an artificial intelligence cooking device according to another embodiment of the present disclosure.

FIG. 14 is a diagram illustrating a method for operating an artificial intelligence cooking device according to another embodiment of the present disclosure. In the foregoing embodiment, it is described that the AI model is mounted in the artificial intelligence cooking device. However, the present disclosure is not limited thereto, and the AI model can be mounted in an artificial intelligence server 1330.

In an example, the artificial intelligence server 1330 can communicate with a plurality of artificial intelligence cooking devices 1, 1310, and 1320 and provide a boiling detection service to the plurality of artificial intelligence cooking devices 1, 1310, and 1320. Specifically, the artificial intelligence cooking device 1000 can transmit the data corresponding to the vibration signal to the artificial intelligence server 1330.

In this situation, the artificial intelligence server 1330 can receive the data corresponding to the vibration signal and input the data corresponding to the vibration signal into the AI model to obtain the information on whether the ingredients in the cooking vessel are boiling. Further, the artificial intelligence server 1330 can transmit the information on whether the ingredients in the cooking vessel are boiling to the artificial intelligence cooking device 1000.

In an example, the artificial intelligence cooking device 1000 can receive the information on whether the ingredients in the cooking vessel are boiling, and can perform control based on the received information.

Figure 15:
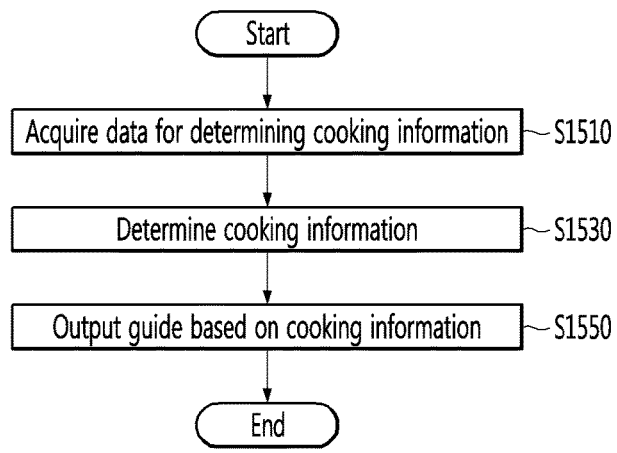
FIG. 15 is a diagram illustrating a cooking assistance method of an artificial intelligence cooking device according to an embodiment of the present disclosure.

FIG. 15 is a diagram illustrating a cooking assistance method of an artificial intelligence cooking device.

The cooking assistance method of the artificial intelligence cooking device 1 may include obtaining data for determining cooking information (S1510), obtaining cooking information including at least one of cooking behavior information or state information about ingredients based on the data for determining the cooking information (S1530), and outputting a guide based on the cooking information (S1550).

Figure 16:
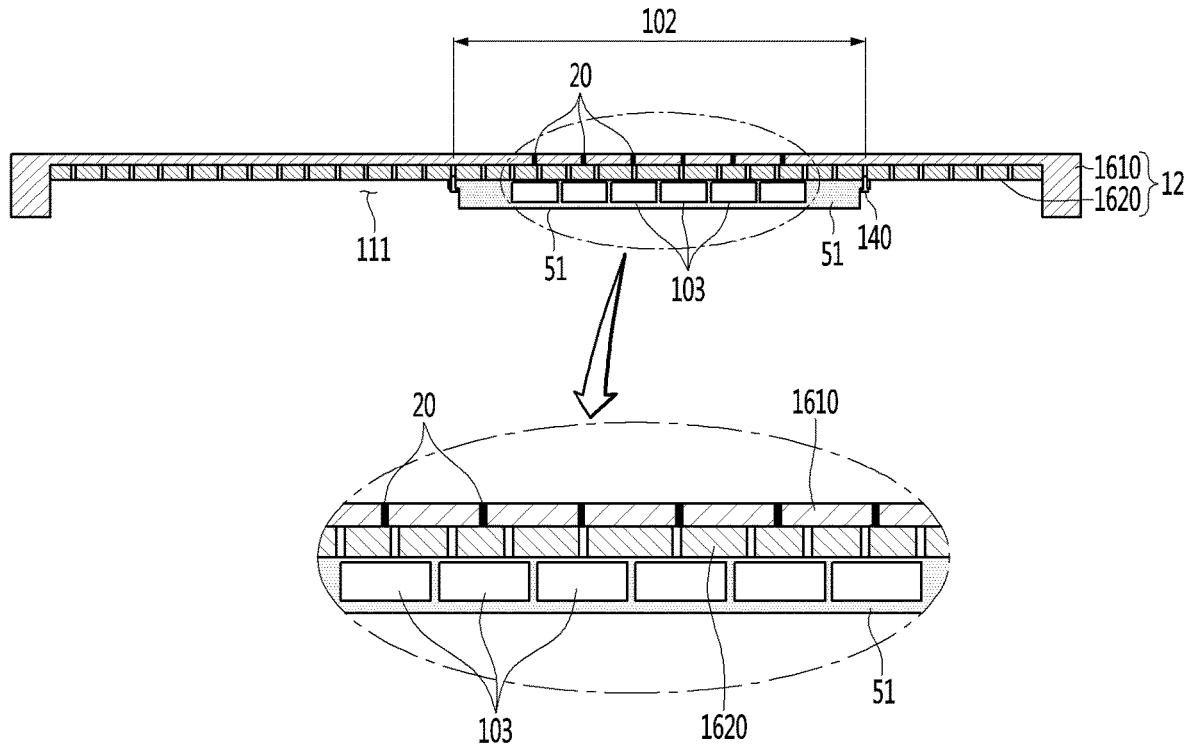
FIG. 16 is a diagram for describing a method for obtaining data for determining cooking information according to an embodiment of the present disclosure.

FIG. 16 is a diagram for describing a method for obtaining data for determining cooking information.

The processor may obtain data for determining cooking information through a sensor.

The sensor may include a vibration sensor that senses a vibration signal of ingredients contained a cooking vessel and a weight sensor that senses a weight of the cooking vessel containing the ingredients.

The structure for obtaining the vibration signal and the method for obtaining the vibration signal have been described above with reference to FIGS. 1 to 14. Therefore, a method for sensing the weight of the cooking vessel containing ingredients will be described with reference to FIG. 16.

The sensor may include at least one of a temperature sensor, a detection sensor, or a piezoelectric sensor. At least one of the temperature sensor, the detection sensor, or the piezoelectric sensor may be formed as one module. Such a module may be defined as the sensor unit 20. One or more sensor units 20 may be arranged in one heating region.

The sensor unit 20 may be arranged to correspond to the heating region 102 such that the state of the cooking vessel can be easily determined. When a plurality of heating regions 102 are present, a plurality of sensor units 20 may be arranged to correspond to the plurality of heating regions.

The temperature sensor may measure the temperature of the cooking vessel and provide the measured value to the processor. Specifically, the temperature sensor may measure the temperature of one region of the cooking vessel seated in the heating region 102 and provide the measured value to the processor.

Meanwhile, the temperature sensor may be arranged to vertically overlap the heating region 102.

A heater may include a case 51 forming an accommodating space therein and a working coil 103 that generates a magnetic field to induce an eddy current in the cooking vessel to thereby heat the cooking vessel.

Meanwhile, a plate 12 may support the cooking vessel thereon and cover the working coil 103.

The plate 12 may include a top plate 1620 or may include a top plate 1620 and a cover 1610. FIG. 16 illustrates a case in which the plate 12 includes the top plate 1620 and the cover 1610. However, the structure of the plate 12 is not limited thereto.

The cover 1610 is positioned on the plate 1620 and covers at least the upper portion of the top plate 1620. The cover 1610 supports the cooking vessel.

The cover 1610 may be made of a material having heat resistance and rigidity without interfering electromagnetic induction generated between the heater and the cooking vessel.

The top plate 1620 forms the plate 12 together with the cover 1610, or the top plate 1620 alone forms the plate 12. The top plate 1620 supports the cover 1610 or the cooking vessel. The top plate 1620 is arranged under the cover 1610. The top plate 1620 is formed in a plate shape. The top plate 1620 has a shape corresponding to the cover 1610. The top plate 1620 provides a space in which the heater is coupled.

The working coil 103 is exposed to above the case 51 and is arranged adjacent to the top plate 1620.

The working coil 103 may be arranged to correspond to the heating region 102. Specifically, the working coils 103 may be spaced apart from each other in a two-dimensionally constant area as viewed from the above.

In addition, the sensor unit 20 including at least one of the temperature sensor, the detection sensor, or the piezoelectric sensor may be arranged to correspond to the working coil 103 and the heating region 102.

Specifically, at least one of the temperature sensor, the detection sensor, or the piezoelectric sensor may be arranged on the plate 12 overlapping the working coil 103 and the heating region 102. More specifically, at least one of the temperature sensor, the detection sensor, or the piezoelectric sensor may be arranged in a region overlapping the working coil 103 and the heating region 102, and may be interpolated in the cover 1610 of the plate 12.

In the case of the structure in which the cover 1610 is not present, at least one of the temperature sensor, the detection sensor, or the piezoelectric sensor may be interpolated to the top plate 1620.

Meanwhile, the weight sensor described in the present disclosure may be the piezoelectric sensor described above. However, the present disclosure is not limited thereto, and various sensors capable of measuring weight may be used as the weight sensor.

Figure 19:
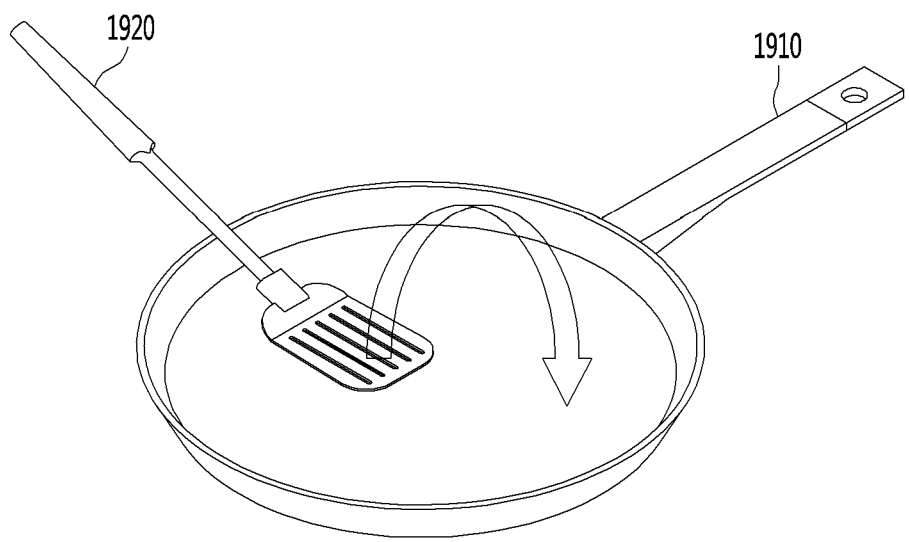

FIGS. 17 to 19 are diagrams for describing a variety of cooking behavior information that the AI model has to infer.

The cooking behavior information may include various cooking operations.

A first cooking operation included in the cooking behavior information may be mixing illustrated in FIGS. 17(*a*) and 18(*a*).

The mixing may be an operation of uniformly mixing ingredients in a cooking vessel 1710. For example, when adding additional material, a user may mix the ingredients such that the added material is uniformly dispersed. In another example, in a steamed dish, the user may mix the ingredients to prevent only the ingredients placed at the bottom to quickly cook. Meanwhile, the mixing may be a cooking operation that is frequently performed in stir-fried dish.

As illustrated in FIGS. 17(*a*) and 18(*a*) the mixing may be an operation of circulating the ingredients up and down by using a cooking utensil 1720, but the present disclosure is not limited thereto.

A second cooking operation included in the cooking behavior information may be stirring illustrated in FIGS. 17(*b*) and 18(*b*).

The stirring may be an operation of preventing the ingredients contained in the cooking vessel 1710 from burning. For example, when making a steak sauce, the user can stir the ingredients such that the ingredients do not stick to the bottom of the cooking vessel. Meanwhile, the stirring may be a cooking operation that is frequently performed during a boiling process.

As illustrated in FIGS. 17(*b*) and 18(*b*), the stirring may be an operation of rotating the ingredients on a plane by using the cooking utensil 1720, but the present disclosure is not limited thereto.

A third cooking operation included in the cooking behavior information may be flipping illustrated in FIG. 19.

The flipping may be an operation of causing the other side of the ingredients to contact the cooking vessel 1910 in a state in which the specific side of the ingredients contacts the cooking vessel. For example, when grilling fish, the user may flip the fish by using a cooking utensil 1920 such that the opposite side of the fish contacts the cooking vessel (e.g., a frying pan). Meanwhile, the flipping may be a cooking operation that is frequently performed in roasting dish.

The cooking operation is not limited to the mixing, the stirring, and the flipping. In addition to these, various cooking operations may exist.

Meanwhile, the cooking behavior information may include a cooking operation in a specific vessel.

The cooking operation in the specific vessel may include a type of a cooking vessel and a cooking operation to be performed.

For example, the cooking behavior information may include a first cooking operation in a first cooking vessel, a second cooking operation in the first cooking vessel, the first cooking operation in a second cooking vessel, the second cooking operation in the second cooking vessel, and a third cooking operation in the second cooking vessel.

As illustrated in FIG. 17(*a*), the first cooking operation in the first cooking vessel 1710 may be mixing in a pan.

In addition, as illustrated in FIG. 17(*b*), the second cooking operation in the first cooking vessel 1710 may be stirring in the pan.

In addition, as illustrated in FIG. 18(b), the first cooking operation in the second cooking vessel 1810 may be the mixing in a frying pan.

In addition, as illustrated in FIG. 18(b), the second cooking operation in the second cooking vessel 1810 may be the stirring in the frying pan.

In addition, as illustrated in FIG. 19, the third cooking operation in the second cooking vessel 1910 may be flipping in the frying pan.

Meanwhile, the cooking behavior information may include closing of a lid. The closing of the lid may refer to the operation of closing all or part of the upper portion of the cooking vessel with the lid of the cooking vessel (pot, frying pan, etc.).

In addition, the cooking behavior information may include additional addition of ingredients. The additional addition of the ingredients may refer to an operation of additionally adding water or ingredients in a state in which the ingredients are already contained in the cooking vessel. However, the present disclosure is not limited thereto, and the additional input of the ingredients may include an operation of initially inputting ingredients into the cooking vessel.

Figure 20:
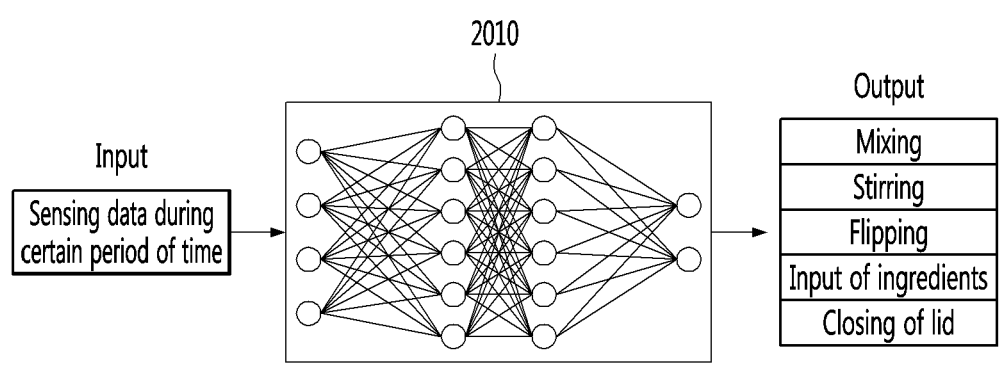
FIGS. 20 and 21 are diagrams for describing a method for training a neural network such that an artificial intelligence model can infer cooking behavior information about a user according to an embodiment of the present disclosure.
Figure 21:
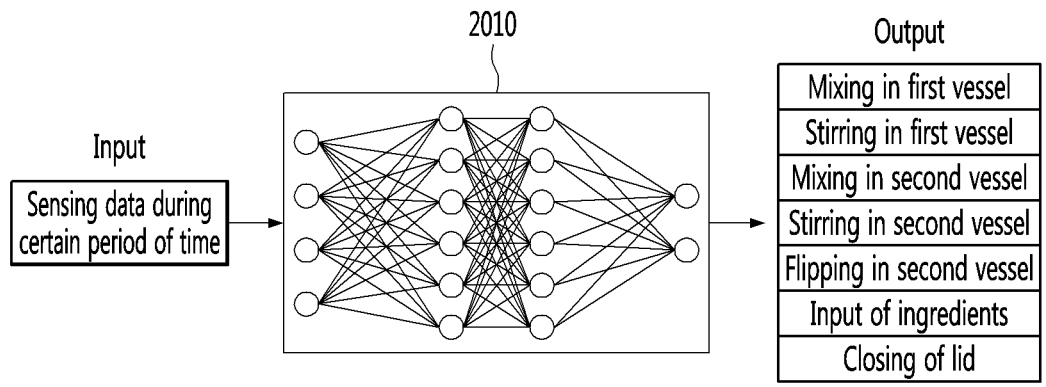

FIGS. 20 and 21 are diagrams for describing a method for training a neural network such that an AI model can infer cooking behavior information about a user.

The AI model may use at least one of a vibration signal or a weight to infer the cooking behavior information.

Since the vibration signal is the same as described above, the weight will be described herein.

The weight may refer to the weight of the cooking vessel containing the ingredients.

A weight change pattern may be changed according to the cooking behavior of the user. Therefore, when the user performs a specific cooking behavior, the weight change may exhibit unique characteristics.

For example, when the user performs cooking, the change amount of the weight may be larger than when the user does not perform cooking and the weight may be changed more frequently.

In another example, the flipping is a one-time cooking operation, whereas the stirring and the mixing may have persistence. Therefore, when the cooking operation is the flipping, the weight change may appear one time. However, when the cooking operation is the stirring and the mixing, the weight change may continuously appear.

In another example, the flipping may have a greater weight change, as compared to the flipping because the ingredients float in the air and then rest in the cooking vessel. In addition, since the vertical movement of the cooking utensil is large in the flipping, the weight change may be larger than that of the stirring having a large rotating movement of the cooking utensil.

In another example, while the ingredients are circulated differently according to an operation such as the mixing, the flipping, or the stirring, the aspect of weight change may be changed.

In addition, the pattern of the weight change may be changed according to the cooking vessel. For example, the mixing operation in the frying pan can draw a larger circle than the mixing operation in the pot. Since the center of gravity of the frying pan is also different from the center of gravity of the pot, the aspect of the weight change may be changed accordingly. For example, the mixing operation in the pot may have a greater vertical movement than the mixing operation in the frying pan. Since the center of gravity of the frying pan is different from the center of gravity of the pot, the aspect of the weight change may also be changed.

In another example, the weight may increase when the lid is closed or when additional ingredients are input. In addition, before and after the increase in weight, the pattern of the weight change may be changed.

Therefore, the trained neural network (AI model) can infer what cooking behavior is being performed by extracting various patterns of the weight change as features. Therefore, in addition to the above examples, the trained neural network (AI model) can infer what cooking behavior is being performed by extracting features that humans cannot predict from weight data detected in various cooking behaviors.

Meanwhile, the pattern of the weight change may be obtained from one weight sensor arranged in one heating region. However, the present disclosure is not limited thereto, and the pattern of the weight change may be obtained by collecting sensing values of the plurality of weight sensors arranged in one heating region in a dispersed manner.

Meanwhile, the training apparatus 200 may train the neural network 2010 by labeling one of a plurality of classes to training data corresponding to the weight.

The plurality of classes may be a variety of cooking behavior information described above. For example, as illustrated in FIG. 20, the plurality of classes may include a user's first cooking operation (e.g., mixing), a second cooking operation (e.g., stirring), a third cooking operation (e.g., flipping), closing of a lid, and additional input of ingredients.

In another example, as illustrated in FIG. 21, the plurality of classes may include a first cooking operation (stirring in the pot) in a first cooking vessel, a second cooking operation in the first cooking vessel (stirring in the pot), the first cooking operation in a second cooking vessel (stirring in the frying pan), the second cooking operation in the second cooking vessel (stirring in the frying pan), a third cooking operation in the second cooking vessel (flipping in the frying pan), closing of a lid, and additional input of ingredients.

The training apparatus 200 may detect the weight by using the weight sensor and convert the detected weight into data corresponding to the detected weight. In addition, the training apparatus 200 may train the neural network by using data corresponding to the weight as an input value and cooking behavior information obtained when the weight is detected as an output value. The cooking behavior information may be a correct answer that the neural network has to infer by using data corresponding to the weight.

Therefore, the training apparatus 200 may label one of the plurality of classes to training data corresponding to the weight and provide the labeled class to the neural network.

In this situation, the neural network may infer a function related to the correlation of the cooking behavior information and data corresponding to the weight by using the training data corresponding to the weight and the labeled cooking behavior information. Parameters (weight, bias, etc.) of the neural network can be determined (optimized) by evaluating the function inferred by the neural network.

Meanwhile, the training apparatus 200 may train the neural network by using data of time interval during the cooking behavior or before or after the cooking behavior.

For example, the training apparatus 200 may train the neural network by using weight data during a user's mixing operation.

In another example, the training apparatus 200 may train the neural network by using the weight data of the time interval before and after the user closes or opens the lid (for example, weight data for a total of 10 seconds (5 seconds before closing the lid and 5 seconds after closing the lid)).

Meanwhile, the training apparatus 200 may train the neural network by using the change pattern of the weight data generated by various cooking behaviors and cooking behavior information when the change pattern is generated.

Meanwhile, the user's action or the change in weight according to the user's action may also affect the vibration signal.

For example, the vibration signal may be changed according to the cooking operation such as stirring, flipping, or mixing. In another example, when the weight is changed according to the cooking operation such as stirring, flipping, or mixing, or when the weight is changed by closing the lid or adding ingredients, the vibration signal may be changed. In addition, even when the same weight is added, the vibration signal generated after the lid is closed and the vibration signal generated after the ingredients are added may have different amplitudes, frequencies, and patterns.

Therefore, the training apparatus may train the neural network by labeling cooking behavior information to training data including weight data and vibration data.

Specifically, the training apparatus 200 may train the neural network by using weight data and vibration data as an input value and cooking behavior information obtained when weight and vibration are detected as an output value. The cooking behavior information may be a correct answer that the neural network has to infer by using weight data and vibration data.

In addition, the training apparatus 200 may train the neural network by using weight data and vibration data of time interval during the cooking behavior or before or after the cooking behavior.

The training apparatus 200 may train the neural network by using vibration data, except for weight data. For example, the amplitude, frequency, pattern, or the like of the vibration signal may be different according to whether the lid is opened or closed. Therefore, the processor may train the neural network by labeling cooking behavior information to training data including vibration data.

Meanwhile, the neural network trained in the above manner can be referred to as an AI model.

Meanwhile, the AI model may be mounted on the artificial intelligence cooking device.

Specifically, the AI model may be implemented in hardware, software, or a combination of hardware and software. When all or part of the AI model is implemented in software, one or more instructions constituting the AI model may be stored in the memory 170 of the artificial intelligence device.

The processor may obtain cooking information including at least one of cooking behavior information or state information about ingredients by using the data obtained by the sensor.

Specifically, the processor may provide, to the AI model, at least one of a weight or a vibration signal detected by the sensor.

In this situation, the processor may provide the AI model with data having the same format as the data used as the training data of the AI model. For example, when weight data is used as training data for the AI model, the processor may provide the weight data to the AI model. In another example, when weight data and vibration data are used as training data of the AI model, the processor may provide the weight data and the vibration data to the AI model.

In addition, the processor may provide data of a certain time interval to the AI model.

Specifically, the vibration signal and the weight may be detected in time series.

Therefore, the processor 180 may divide the data collected in time series into time intervals having a certain size.

Meanwhile, the plurality of time intervals may be continuous, but the present disclosure is not limited thereto. The plurality of time intervals may not be continuous or may overlap each other.

The processor may also provide at least one of the weight data or the vibration data to the AI model in real time.

Specifically, when the data corresponding to the time interval of the certain size is obtained, the processor may input the data corresponding to the time interval of the certain size to the AI model in real time. For example, when it is assumed that the certain size is 10 seconds, the processor may input the data of the time interval of 500 seconds to 510 seconds to the AI model immediately after the data of the time interval of 500 seconds to 510 seconds is obtained, and may input the data of the time interval of 510 seconds to 520 seconds to the AI model immediately after the data of the time interval of 510 seconds to 520 seconds is obtained.

In addition, the processor may sequentially input the data of the plurality of time intervals to the AI model according to the time order of the plurality of time intervals.

Meanwhile, the processor may obtain cooking behavior information by using the data obtained by the sensor.

Specifically, the processor may provide the data obtained from the sensor to the AI model.

The AI model may be a neural network trained by using the cooking behavior information as the labeling data. In this situation, the AI model may output the result values, for example, scores or probabilities corresponding to the plurality of classes (the cooking operation, the cooking operation in the specific vessel, the closing of the lid, the additional input of the ingredients, etc.).

The processor may obtain the cooking behavior information based on the result values that the AI model outputs using the data provided to the AI model. For example, when the AI model outputs the probability of "flipping in the frying pan" as 97%, the processor may determine that the user has performed "flipping in the frying pan."

Meanwhile, it has been described that the cooking behavior information is obtained by providing the data obtained by the sensor to the AI model, but the present disclosure is not limited thereto.

Specifically, the processor may directly process the data obtained by the sensor to obtain the cooking behavior information. For example, when the weight of the cooking vessel is increased, the processor may determine that additional ingredients have been added. In another example, when the weight of the cooking vessel is increased and the pattern of the vibration signal is changed, the processor may determine that the lid is closed.

In addition, the cooking behavior information may include a user's action of spooning out the ingredients. The processor may determine that the user has spooned out the ingredients when a sudden decrease in the weight of the content is detected (when a decrease amount of weight within a certain time is equal to or greater than a certain value).

Meanwhile, the cooking behavior information may be obtained through an image captured by the camera. Specifically, the processor may receive the image captured by the camera and determine the cooking behavior about the user through image recognition.

Meanwhile, the processor may obtain the state information about the ingredients by using the data obtained from the sensor.

The state information may include at least one of information about whether the ingredients contained in the cooking vessel boil, information about whether the ingredients contained in the cooking vessel boil over, or information about whether the ingredients contained in the cooking vessel burn.

The method for obtaining the information about whether the ingredients contained in the cooking vessel boil has been described with reference to FIGS. 1 to 14.

Meanwhile, the processor may obtain the information about whether the ingredients contained in the cooking vessel boil over by using the data obtained by the sensor.

For example, the Artificial intelligence device may be equipped with an AI model that determines whether the ingredients contained in the cooking vessel boil over. The AI model may be a neural network trained by labeling whether the ingredients boil over to data corresponding to the vibration signal. In this situation, the processor may obtain the information about whether the ingredients contained in the cooking vessel boil over by providing the vibration signal obtained by the sensor to the AI model.

In another example, the plate 12 may include a capacitive sensor. When information indicating that the ingredients contained in the cooking vessel boil is obtained and the capacitive sensor senses contact of a liquid for a certain time or more, the processor may determine that the ingredients contained in the cooking vessel boil over.

Meanwhile, the processor may obtain information about whether the ingredients contained in the cooking vessel burn. Specifically, it has been described that the plate 12 is provided with a temperature sensor.

However, the present disclosure is not limited thereto, and the temperature sensor may be provided in a hood installed above the Artificial intelligence device. In this situation, the temperature sensor may be an infrared sensor, and the temperature of the ingredients may be detected by using an infrared signal.

Meanwhile, the processor may obtain information about whether the ingredients contained in the cooking vessel burn, based on the temperature sensed by the temperature sensor. For example, when the temperature sensed by the temperature sensor is equal to or greater than a preset value, the processor may determine that the ingredients contained in the cooking vessel burn. In another example, when the temperature rises sharply (when the rate of increase of the temperature is equal to or greater than a preset value), the processor may determine that the ingredients contained in the cooking vessel burn.

Meanwhile, the processor may obtain cooking information including at least one of cooking behavior information or state information about the ingredients, and output a guide based on the cooking information.

First, a method for outputting a guide according to cooking behavior information will be described.

Figure 22:
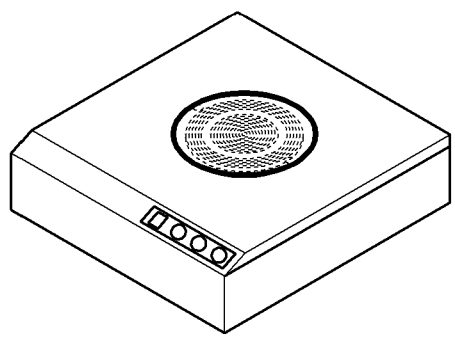
FIG. 22 is a diagram for describing a method for outputting a guide according to cooking behavior information according to an embodiment of the present disclosure.

FIG. 22 is a diagram for describing a method for outputting a guide according to cooking behavior information.

The guide may include a query about at least one of decreasing heating intensity of the heater, increasing the heating intensity of the heater, stopping a heating operation of the heater, starting the heating operation of the heater, a heating time of the heater, or a cooking behavior of a user.

In addition, the processor may output a guide when cooking information is obtained, may output a guide when cooking information is obtained for a certain time, or may output a guide when cooking information is not obtained for a certain time.

When the user's answer is received, the processor may perform an operation according to the user's answer.

For example, it is assumed that the cooking operation of closing the lid is detected. The cooking operation of closing the lid may generally be performed to boil the ingredients.

In this situation, the processor may output a query about the increase of the heating intensity (D you want to heat higher?) and may increase the heating intensity of the heater when an affirmative response is received from the user.

In addition, when a cooking operation of closing the lid is detected, the processor may output a query about the heating time (How long it will heat up?). In this situation, when a response (voice input) for setting a time is received from the user, the processor may perform the heating for a set time.

In another example, it is assumed that the cooking operation of stirring in the frying pan is detected. The stirring operation in the frying pan may be an operation for preventing the ingredients from burning while boiling the ingredients. In this situation, the processor may output a query about the decrease of the heating intensity (Do you want to heat weaker), and may perform an operation according to a user's answer (voice input).

In another example, it is assumed that the cooking motion of stirring in the pot is detected. The stirring operation in the pot can generally mean that cooking is almost complete (for example, when the curry is almost complete). In this situation, the processor may output a query about the heating time of the heater (How long will it heat up?).

In another example, the user's action of spooning out the ingredients was detected based on a sudden change in weight. This may mean that the user spoons out the dish, which may mean that the dish is almost complete. In this situation, the processor may output a query about the decrease of the heating intensity (Do you want to heat weaker) or may output a query about the heating time (How long will it heat up?).

In another example the additional input of the ingredients was detected. When the ingredients is input additionally, the temperature of the content may be instantaneously lowered. In this situation, the processor may output a query about the increase of the heating intensity (Do you want to heat higher?).

In another example, the cooking action of mixing in the frying pan has been detected for a certain time or more. When the mixing operation in the frying pan is performed for a long time, the ingredients may burn (When the ingredients are continuously heated while making a fried rice for a long time, the ingredients may burn). In this situation, the processor may output a query about stopping of the heating operation of the heater (Do you want to turn off heater?).

In another example the additional input of the ingredients was detected. When additional ingredients are input, the ingredients has to be mixed. However, when the ingredients are additionally input and the mixing operation is not obtained for a certain time, the processor may output a query about the user's cooking operation (Please mix the ingredients!).

In another example, the user's flipping operation was detected. However, when the next flipping operation is not obtained for a certain time, the processor may output a query about the uses' cooking operation (Do you want to flip the ingredients?).

In addition, the processor may output the guide based on the detection of the cooking operation and the time elapsed after the detection of the cooking operation.

For example, the input of the ingredients was detected. If too much time has elapsed after the input of the ingredients (when a preset time has elapsed after the input of the ingredients), the processor may output a query about the user's cooking operation (Do you want to flip the ingredients?) or may output a query about the stopping of the heating operation (Do you want to turn off heater?).

In another example, the flipping operation was detected. If too much time has elapsed after the flipping operation (when a preset time has elapsed after the flipping operation), the processor may output a query about the user's cooking operation (Do you want to flip the ingredients?) or may output a query about the stopping of the heating operation (Do you want to turn off heater?).

Meanwhile, the guide may include a state notification regarding an elapsed time after the cooking behavior.

Specifically, the processor may calculate the time elapsed from the time when the cooking was performed by using the timer. The processor may output the time elapsed from the time when the cooking was performed.

For example, when the closing of the lid is detected, the processor may further output a state notification indicating the time elapsed from the closing of the lid.

Next, a method for outputting a guide according to state information about the ingredients will be described.

Figure 23:
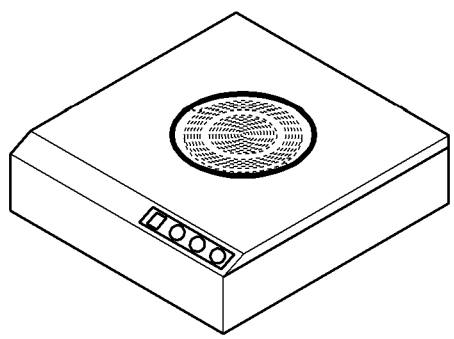
FIG. 23 is a diagram for describing a method for outputting a guide according to cooking behavior information according to an embodiment of the present disclosure.

FIG. 23 is a diagram for describing a method for outputting a guide according to cooking behavior information.

The guide may include a query about at least one of decreasing heating intensity of the heater, increasing the heating intensity of the heater, stopping a heating operation of the heater, starting the heating operation of the heater, a heating time of the heater, or a cooking behavior of a user. The guide may also include a state notification of the cooking state.

The processor may obtain state information including information about whether the ingredients contained in the cooking vessel boil by using data corresponding to the vibration signal and may output a guide based on the state information.

Specifically, the processor may output information about whether the ingredients contained in the cooking vessel boil and the time elapsed after the ingredients start boiling by using the timer. In this situation, the processor may output information about the time elapsed after the ingredients start boiling at regular intervals.

For example, the processor may output a message "30 minutes have elapsed since the ingredients boiled" 30 minutes after the ingredients started boiling and may output a message "1 hour has elapsed since the ingredients boiled" 1 hour after the ingredients started boiling.

In addition, when the ingredients start boiling, the processor may output a state notification indicating that the ingredients started boiling.

Meanwhile, the processor may obtain state information including information about whether the ingredients contained in the cooking vessel burn by using temperature data of the ingredients and may output a guide based on the state information when the ingredients contained in the cooking vessel burn. For example, the processor may output a state notification "Ingredients are burning."

In addition, when the ingredients contained in the cooking vessel burn, the processor may control the heater to stop heating even when a user's answer is not received.

Meanwhile, the processor may obtain state information including information about whether the ingredients contained in the cooking vessel boil over and may output a guide based on the state information when the ingredients contained in the cooking vessel boil over. For example, the processor may output a state notification "Ingredients are boiling over."

In addition, when the ingredients contained in the cooking vessel boil over, the processor may control the heater to stop heating even when a user's answer is not received.

The processor may obtain state information including information about whether the ingredients contained in the cooking vessel do not boil and may output a guide based on the state information. For example, the processor may output the query about the user's cooking behavior, like "The ingredients are not boiling. Please close the lid."

Meanwhile, the processor may calculate the time elapsed from the time when new state information about the ingredients is obtained by using the timer. The processor may output the time elapsed from the time when the cooking was performed.

Meanwhile, the processor may output the guide by using the cooking behavior information or the state information individually, but the present disclosure is not limited thereto. The processor may obtain the cooking information including the cooking behavior information and the state information and may output a guide based on the cooking information.

For example, state information indicating that the ingredients contained in the cooking vessel was boiling was detected, and cooking operation of stirring the pot was detected (or state information indicating that the ingredients contained in the cooking vessel was boiling was detected, and cooking operation of stirring the pot was detected for a preset time). This may be a user's operation for preventing ingredients from burning. In this situation, the processor may output a query about the decrease of the heating intensity (Do you want to heat weaker?).

In another example, the state information indicating that the ingredients contained in the cooking vessel is not boiling was detected, and the cooking behavior of closing the lid was detected. This may be the user's operation for boiling the ingredients. In this situation, the processor may output a query about whether the increase of the heating intensity (Do you want to heat higher?).

In another example, the information indicating that the ingredients contained in the cooking vessel is boiling was detected, and the cooking behavior of closing the lid was detected. This may be the user's operation for boiling the ingredients for a long time. In this situation, the processor may output a query about the heating time (How long will it heat up?).

Meanwhile, when the user's answer is received after outputting the guide, the processor may perform an operation corresponding to the answer. For example, when a guide "The ingredients are boiling. Do you want to boil more?" is output and an answer "Steam 3 minutes at medium heat" is received, the processor may control the heater to perform the heating operation based on the heating intensity and the heating time received from the user.

Meanwhile, when the user's answer is not received after outputting the guide, the processor may not perform an operation corresponding to the guide. For example, when a query about the decrease of the heating intensity of the heater is output but the user's answer is not received, the processor may maintain the current heating intensity.

However, the present disclosure is not limited thereto, and the processor may perform an operation corresponding to the guide even after the user's answer is not received after the guide is output. For example, when the ingredients contained in the cooking vessel burn, the processor may output a query "Do you want to stop heating?" When the user's answer is not received, the processor may stop the heating of the heater.

Meanwhile, when the cooking behavior of the user is not detected after the guide is output, the processor may transmit the guide to the user's terminal. For example, when a guide "The ingredients are boiling. Stop heating" is output but the cooking behavior of the user is not detected, the processor may transmit the guide to the user's terminal.

Meanwhile, when the cooking behavior of the user is not detected after the guide is output, the processor may perform an operation corresponding to the guide. For example, when a guide "The ingredients are boiling over. Stop heating" is output but the user's cooking behavior is not detected, the processor may stop the heating of the heater.

Figure 24:
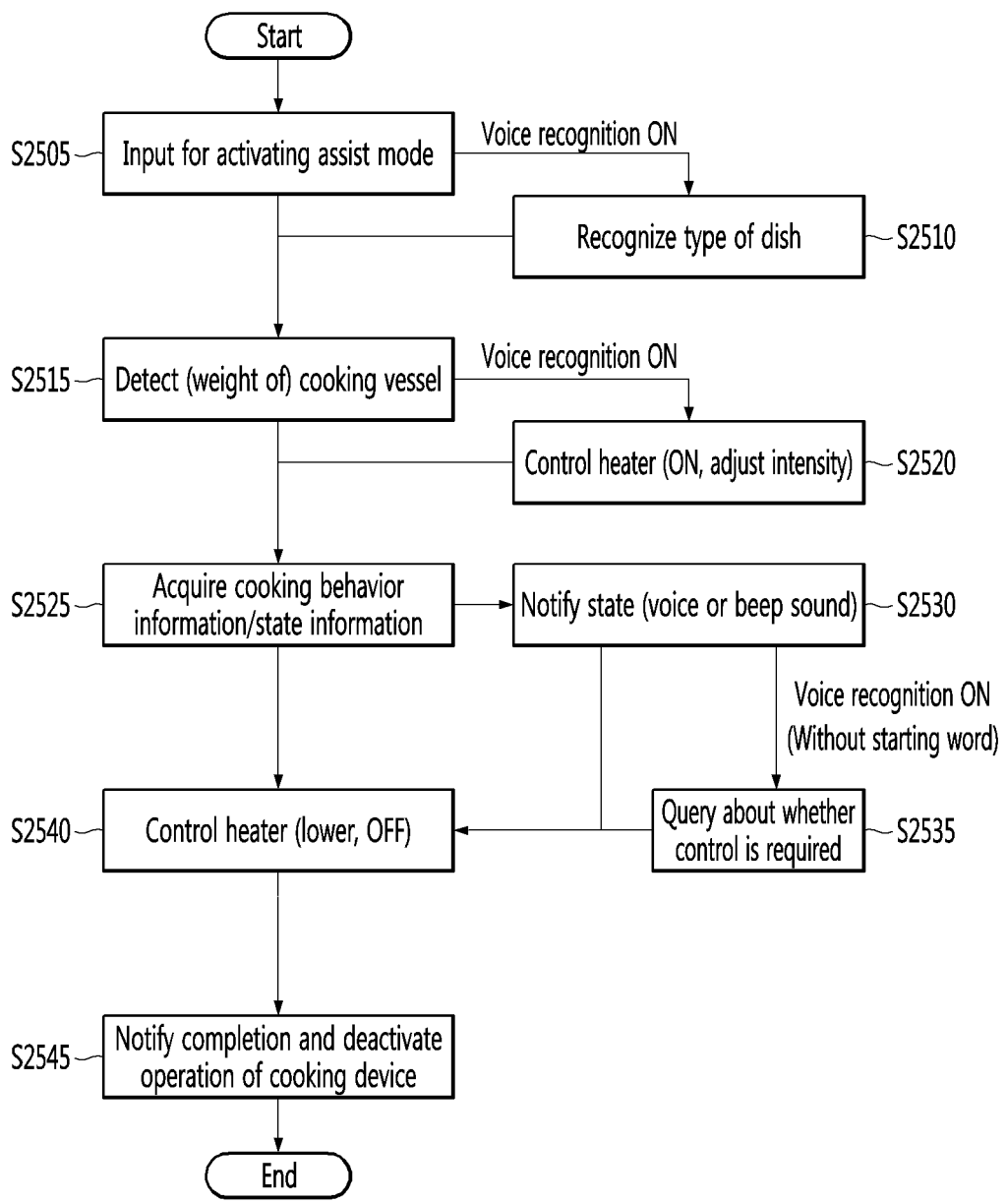
FIG. 24 is a flowchart for describing the overall operation of the artificial intelligence cooking device according to an embodiment of the present disclosure.

FIG. 24 is a flowchart for describing the overall operation of the Artificial intelligence device.

The Artificial intelligence device may include a button (a physical button or an image button displayed on a display) for activating an assist mode. When an input for activating the assist mode is received through the button (S2505), the processor may activate a voice recognition function.

Specifically, the Artificial intelligence device may be equipped with a voice recognition model. When a voice input including a wake-up word is received, the processor may activate the voice recognition function of the voice recognition model. When a voice input including a command is received after the wake-up word is received, the processor may provide the command to the voice recognition model. In this situation, the voice recognition model may perform voice recognition on the received command and output a voice recognition result.

However, when the input for activating the assist mode is received, the processor may activate the voice recognition function. In this situation, the processor may recognize a user's command by using voice data not including the wake-up word, that is, voice data including a command without the wake-up word.

When the voice recognition function is activated, the processor may receive a voice input indicating a type of dish. In this situation, the processor may perform voice recognition on the received voice input to determine the type of dish (S2510).

For example, when a voice input designating the type of dish "red wine sauce" is received, the processor may determine that the type of dish is a red wine sauce.

Meanwhile, the processor may detect the weight of the cooking vessel (S2515). In this situation, the cooking vessel may contain the ingredients, or may not contain the ingredients. The detected weight is the initial weight of the cooking vessel, which can then be used to measure the change in weight.

Meanwhile, when the seating of the cooking vessel is detected by the change in weight, the processor may recognize a user's command by using voice data not including the wake-up word. That is, when the seating of the cooking vessel is detected through the change in weight, the processor may activate the voice recognition function even when the wake-up word is not received.

Meanwhile, the processor may receive an input for controlling the heater (S2520). For example, the processor may receive a voice input for staring the heating of the heater, adjusting the heating intensity, or setting the heating time.

Meanwhile, when the type of dish is received, the processor may output a guide for initial setting of the cooking operation based on a recipe corresponding to the type of dish.

Specifically, the processor may receive, from the server, the recipe corresponding to the type of dish. The processor may output a guide for initial setting of the cooking operation based on the cooking description included in the recipe.

For example, it is assumed that the recipe describes the first cooking method as follows: "Add red wine and garlic and heat for 5 minutes at medium intensity." In this situation, the processor may output a query "Do you want to heat up for 5 minutes at medium intensity?"

When an affirmative answer to the query is received, the processor may perform an operation corresponding to the guide.

The processor may obtain cooking information including at least one of cooking behavior information or state information about ingredients (S2525).

When the cooking information is obtained, the processor may output a state notification (S2530).

Meanwhile, when the state notification is output or when the guide is output, the processor may recognize a user's command by using voice data not including the wake-up word. That is, when the state notification is output or when the guide is output, the processor may activate the voice recognition function even when the wake-up word is not received.

Meanwhile, the processor may output the guide by using the type of dish and the cooking information (S2535).

Specifically, the processor may output a guide for initial setting of the cooking operation based on the cooking information and the cooking description included in the recipe corresponding to the type of dish.

This will be described in detail with reference to FIG. 25.

Figure 25:
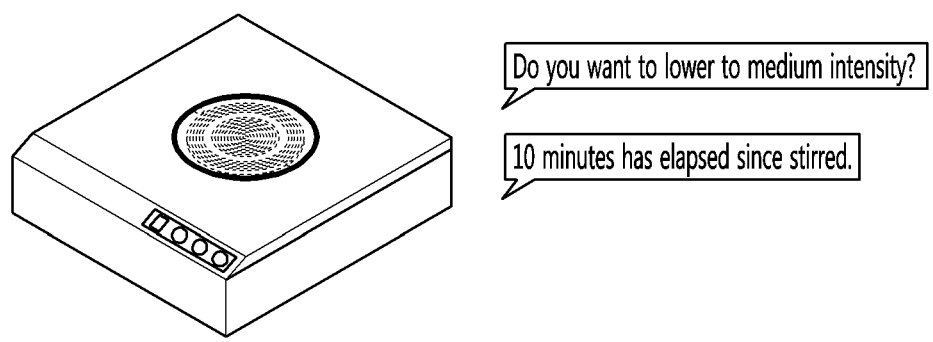
FIG. 25 is a diagram for describing a method for outputting a guide based on a type of dish and cooking information according to an embodiment of the present disclosure.

FIG. 25 is a diagram for describing a method for outputting a guide based on a type of dish and cooking information The processor may output a guide when an appropriate behavior according to the type of dish does not match the cooking behavior information. The appropriate behavior may be the behavior described in the cooking description in the recipe corresponding to the type of dish, but the present disclosure is not limited thereto.

For example, when stirring is described in the recipe but the user's cooking behavior is mixing, the processor may output a guide for the cooking behavior (Please stir the ingredients!).

For example, when 10 minutes of stirring is described in the recipe but the user is stirring for more than 10 minutes, the processor may output a guide "10 minutes have elapsed since stirring. Do you want to stop?"

In another example, when the closing of the lid 5 minutes after the start of cooking is described in the recipe but the user does not close the lid, the processor may output a guide "Five minutes have elapsed since the start of cooking. Do you want to close the lid?"

Meanwhile, the processor may output a guide when the appropriate state according to the type of dish does not match the state information.

For example, when boiling for 10 minutes is described in the recipe but the ingredients boil for more than 10 minutes, the processor may output a guide "Ten minutes have elapsed since the ingredients started boiling. Do you want to stop heating?"

In addition, the processor may output a guide by using the type of dish and the state information. For example, when "boiling for 40 minutes" is described in the recipe and the boiling of the ingredients is detected, the processor may output a query "Do you want to boil for 40 minutes?"

Meanwhile, the state information may further include the heating intensity of the heater, the heating time of the heater, and the like. The processor may output a guide when the appropriate state according to the type of dish does not match the state information.

For example, when heating for 15 minutes at low intensity is described in the recipe but the ingredients are heated at medium intensity, the processor may output a guide "Do you want to heat up with low intensity?"

In another example, when cooking for 10 minutes with strong intensity and then cooking for 5 minutes with medium intensity is described in the recipe and the ingredients are currently cooked for more than 10 minutes at strong intensity, the processor may output a guide "Do you want to heat up at medium intensity?"

In another example, when heating for 5 minutes and then turning off heater is described in the recipe but the ingredients are heating for more than 5 minutes, the processor may output a guide "Do you want to stop heating?"

Meanwhile, when the appropriate behavior according to the type of dish matches the cooking behavior information, the processor may output a guide based on the recipe of the type of dish.

Specifically, when the cooking behavior information about the user matches the behavior described in the description of the recipe, the processor may output another description described in the recipe.

For example, "40 minutes at medium intensity while stirring" is described in the recipe and the user's stirring is detected, the processor may output a guide "Please stir for 40 minutes" or "Do you want to lower to medium intensity?"

Returning to FIG. 24, when the answer is received from the user, the processor may control the heater to operate based on the user's answer (S2540). When the cooking is completed, the processor may output a completion notification and deactivate the operation of the cooking device (S2545).

As described above, the Artificial intelligence device may serve as the cooking assistant and support the user. Moreover, since the Artificial intelligence device assists the user through the determination of the user's cooking behavior or the current cooking state, there is an advantage that can increase the usability and convenience of the Artificial intelligence device.

According to the present disclosure, the artificial intelligence cooking device may serve as a cooking assistant and support a user. Further, the artificial intelligence cooking device actively assists the user through the determination of the cooking behavior or the current cooking state, thereby increasing the usability and convenience of the artificial intelligence cooking device.

The above-described present disclosure may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices. Also, the computer may include a processor 180 of the terminal.

Therefore, the detailed description is intended to be illustrative, but not limiting in all aspects. It is intended that the scope of the present disclosure should be determined by the rational interpretation of the claims as set forth, and the modifications and variations of the present disclosure come within the scope of the appended claims and their equivalents.

What is claimed is:

1. An artificial intelligence cooking device comprising:
   an output interface disposed in a plate;
   a heater configured to heat ingredients contained in a cooking vessel;
   a vibration sensor module configured to detect a vibration signal of the ingredients contained in the cooking vessel; and
   a processor configured to:
      obtain cooking information including at least one of cooking behavior information or state information about the ingredients based on data obtained by a vibration sensor; and
      output a guide based on the cooking information through the output interface,
   wherein the vibration sensor module includes the vibration sensor, an inner holder accommodating the vibration sensor, an outer holder accommodating the inner holder, and a connector for supporting the vibration sensor.

2. The intelligence artificial cooking device according to claim 1, further comprising a weight sensor configured to detect a weight of the cooking vessel containing the ingredients,
   wherein the cooking behavior information includes at least one of a cooking operation, a cooking operation in a specific cooking vessel, closing of a lid, or additional input of ingredients.

3. The intelligence artificial cooking device according to claim 2, wherein the processor is further configured to:
   obtain the cooking behavior information by providing the data obtained by the vibration sensor to an artificial intelligence model,
   wherein the artificial intelligence model is a neural network trained based on labeling one of a plurality of classes to training data corresponding to weight.

4. The intelligence artificial cooking device according to claim 3, wherein the plurality of classes includes a first cooking operation of a user and a second cooking operation of the user.

5. The intelligence artificial cooking device according to claim 3, wherein the plurality of classes includes a first cooking operation in a first cooking vessel, a second cooking operation in the first cooking vessel, and the first cooking operation in a second cooking vessel.

6. The intelligence artificial cooking device according to claim 2, wherein the processor is further configured to:
   output the guide when the cooking information is obtained, or output the guide when the cooking information is obtained for a certain time, or output the guide when the cooking information is not obtained for a certain time.

7. The intelligence artificial cooking device according to claim 1, wherein the state information includes at least one of information about whether the ingredients are contained in the cooking vessel boil, information about whether the ingredients contained in the cooking vessel boil over, or information about whether the ingredients contained in the cooking vessel burn.

8. The intelligence artificial cooking device according to claim 7, wherein the processor is further configured to:

obtain the state information including the information about whether the ingredients contained in the cooking vessel boil based on data corresponding to the vibration signal; and output the guide based on the state information.

9. The intelligence artificial cooking device according to claim 7, wherein the processor is further configured to:

obtain the state information including the information about whether the ingredients contained in the cooking vessel burn based on temperature data of the ingredients; and stop heating of the heater when the ingredients contained in the cooking vessel burn.

10. The intelligence artificial cooking device according to claim 1, wherein the processor is further configured to:

obtain cooking information including the cooking behavior information and the state information; and output the guide based on the cooking information.

11. The intelligence artificial cooking device according to claim 1, wherein the guide includes a query about at least one of decreasing heating intensity of the heater, increasing the heating intensity of the heater, stopping a heating operation of the heater, starting the heating operation of the heater, a heating time of the heater, or a cooking behavior of a user.

12. The intelligence artificial cooking device according to claim 1, further comprising:

an input interface, wherein the processor is further configured to:

receive an input of a type of dish through the input interface; and output the guide based on the type of dish and the cooking information.

13. The intelligence artificial cooking device according to claim 12, wherein the processor is further configured to:

output the guide when a behavior according to the type of dish does not match the cooking behavior information, or output the guide when a state according to the type of dish does not match the state information.

14. The intelligence artificial cooking device according to claim 12, wherein the processor is further configured to:

output the guide based on a recipe of the type of dish when the behavior according to the type of dish matches the cooking behavior information.

15. The intelligence artificial cooking device according to claim 1, further comprising:

an input interface, wherein the processor is further configured to:

receive an input of a type of dish through the input interface; and when the type of dish is received by the processor, output a guide for initial setting of a cooking operation based on a recipe corresponding to the type of dish.

16. The intelligence artificial cooking device according to claim 1, wherein the processor is further configured to:

recognize a user command based on voice data not including a wake-up word, when an input for activating an assist mode is received, when seating of the cooking vessel is sensed, or when a state notification is output.

17. The intelligence artificial cooking device according to claim 1, wherein the processor is further configured to:

in response to receiving voice data including a wake-up word and a user command, output an update to the guide through the output interface or adjust a cooking operation of the heater.

* * * * *